United States Patent
Heo et al.

(10) Patent No.: US 12,238,452 B2
(45) Date of Patent: Feb. 25, 2025

(54) ELECTRONIC DEVICE FOR PROCESSING VIDEO AND METHOD FOR OPERATING THE SAME

(71) Applicant: SAMSUNG ELECTRONICS CO., LTD., Suwon-si (KR)

(72) Inventors: Jin Heo, Suwon-si (KR); Jaehyeon Jeong, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/103,422

(22) Filed: Jan. 30, 2023

(65) Prior Publication Data
US 2023/0247175 A1 Aug. 3, 2023

Related U.S. Application Data

(63) Continuation of application No. PCT/KR2022/021078, filed on Dec. 22, 2022.

(30) Foreign Application Priority Data

Jan. 28, 2022 (KR) .................. 10-2022-0013568

(51) Int. Cl.
*H04N 7/01* (2006.01)
*G09G 5/00* (2006.01)
(Continued)

(52) U.S. Cl.
CPC ......... *H04N 7/0127* (2013.01); *H04N 7/0135* (2013.01)

(58) Field of Classification Search
None
See application file for complete search history.

(56) References Cited

U.S. PATENT DOCUMENTS

| 8,582,660 B2 | 11/2013 | Mahadevan et al. |
| 9,589,540 B2 | 3/2017 | Wu et al. |

(Continued)

FOREIGN PATENT DOCUMENTS

| JP | 2007318193 A | 12/2007 |
| KR | 20100023404 A | 3/2010 |

(Continued)

OTHER PUBLICATIONS

International Search Report and Written Opinion for International Application No. PCT/KR2022/021078; International Filing Date Dec. 22, 2022; Date of Mailing Mar. 22, 2023; 10 Pages.

(Continued)

*Primary Examiner* — Hung Q Dang
(74) *Attorney, Agent, or Firm* — CANTOR COLBURN LLP

(57) ABSTRACT

Disclosed is an electronic device including a display module and a processor. The processor is configured to obtain a first video frame and a bypass control value for the first video frame and determine whether to perform frame rate conversion (FRC) processing using the first video frame based on the bypass control value. Based on a determination that the bypass control value is set to a first value indicating bypass of the FRC processing, the processor is configured to display the first video frame. Based on a determination that the bypass control value is set to a second value indicating the FRC processing, the processor is configured to generate an interpolation frame using the first video frame and a second video frame after the first video frame, and display the first video frame, the interpolation frame, and the second video frame.

20 Claims, 28 Drawing Sheets

(51) Int. Cl.
*G09G 5/14* (2006.01)
*H04N 5/783* (2006.01)
*H04N 13/139* (2018.01)
*H04N 13/332* (2018.01)
*H04N 21/4402* (2011.01)
*H04N 21/462* (2011.01)
*H04N 21/81* (2011.01)

(56) References Cited

U.S. PATENT DOCUMENTS

| | | |
|---|---|---|
| 9,924,134 B2 | 3/2018 | Glen |
| 2007/0273787 A1 | 11/2007 | Ogino et al. |
| 2008/0198264 A1 | 8/2008 | Balram |
| 2009/0147853 A1 | 6/2009 | Dane et al. |
| 2010/0002133 A1 | 1/2010 | Ueno et al. |
| 2010/0150519 A1 | 6/2010 | Takanohashi et al. |
| 2012/0127159 A1 | 5/2012 | Jeon et al. |
| 2015/0146097 A1 | 5/2015 | Izumi |
| 2015/0163450 A1* | 6/2015 | Miyoshi ............. H04N 21/4126 348/441 |
| 2017/0105046 A1* | 4/2017 | Shin ....................... G08B 21/24 |
| 2018/0070122 A1* | 3/2018 | Baek .................. H04N 21/4438 |
| 2018/0132009 A1 | 5/2018 | Ivanovic |
| 2020/0267348 A1* | 8/2020 | Hu ......................... H04N 7/014 |
| 2020/0275050 A1* | 8/2020 | Pytlarz ................. H04N 19/117 |
| 2021/0250544 A1 | 8/2021 | Wang et al. |
| 2022/0264190 A1* | 8/2022 | Atkins ................. H04N 21/435 |

FOREIGN PATENT DOCUMENTS

| | | |
|---|---|---|
| KR | 20100078314 A | 7/2010 |
| KR | 20170134147 A | 12/2017 |
| KR | 20210045099 A | 4/2021 |
| WO | 2017030380 A1 | 2/2017 |

OTHER PUBLICATIONS

Extended European Search Report Issued In EP Application No. 22924388.6-1207, Mail Date Dec. 23, 2024, 12 Pages.

* cited by examiner

ELECTRONIC DEVICE FOR PROCESSING VIDEO AND METHOD FOR OPERATING THE SAME

CROSS-REFERENCE TO RELATED APPLICATION(S)

This application is a continuation application, claiming priority under § 365(c), of an International application No. PCT/KR2022/021078, filed on Dec. 22, 2022, which is based on and claims the benefit of a Korean patent application number 10-2022-0013568, filed on Jan. 28, 2022, in the Korean Intellectual Property Office, the disclosure of each of which is incorporated by reference herein in its entirety.

TECHNICAL FIELD

The embodiments of the disclosure relates to an electronic device that processes video data using frame rate conversion (FRC), and an operation method thereof.

BACKGROUND ART

The frame rate is the rate at which frames (e.g., including images) are captured by a camera or displayed by a device, such as a film projector, television, or digital display. For example, a movie camera may capture frames at a rate of 24 frames per second (FPS) and a film projector may project the frames at the same 24 FPS rate. Some image capture devices (e.g., cameras) may capture frames at a frame rate of 30 FPS, 48 FPS, 60 FPS or higher. Digital display devices, such as high definition televisions (HDTV), may display the frames at a frame rate of 60 FPS or higher.

The frame rate of the image capture device may be different from the frame rate of the display device. The display device may modify (e.g., up-convert) the frame rate of the video captured by the image capture device to match or be similar to the frame rate of the display device using frame rate conversion (FRC).

For example, a video display device supporting a high frame rate, such as 60 FPS, interpolates the received frames to generate interpolation frames, thereby up-converting the video stream of a low frame rate, received from the video server. FRC (or frame rate up conversion (FRUC)) using frame interpolation may enhance the FPS of an output video to provide smoother video playback to the user. For example, a video decoded at 30 FPS may be changed into a video of 60 FPS through FRC.

SUMMARY

According to an embodiment, an electronic device and an operation method thereof may dynamically process generation of interpolation frames through FRC.

According to an embodiment, an electronic device and an operation method thereof may selectively bypass FRC processing according to a bypass control value related to a video frame.

According to an embodiment, an electronic device and an operation method thereof may more efficiently generate interpolation frames and reduce the response time for video playback considering played-back video content and a playback situation (e.g., a current playback speed, use of a preset playback section, and/or a display situation).

According to an embodiment, an electronic device and an operation method thereof may provide dynamic processing for FRC used when displaying video.

According to an embodiment, an electronic device includes a display module and at least one processor operatively connected with the display module. The at least one processor is configured to obtain a first video frame and a bypass control value related to the first video frame from video data. The at least one processor is configured to determine whether to perform frame rate conversion (FRC) processing using the first video frame based on the bypass control value. The at least one processor is configured to, in response to the bypass control value being set to a first value indicating bypass of the FRC processing, display the first video frame on the display module. The at least one processor is configured to, in response to the bypass control value being set to a second value indicating the FRC processing, generate an interpolation frame using the first video frame and a second video frame after the first video frame. The at least one processor is configured to display the first video frame, the interpolation frame, and the second video frame on the display module.

According to an embodiment, a method for operating an electronic device includes obtaining a first video frame and a bypass control value related to the first video frame from video data. The method also includes determining whether to perform frame rate conversion (FRC) processing using the first video frame based on the bypass control value. The method includes, in response to the bypass control value being set to a first value indicating bypass of the FRC processing, displaying the first video frame. The method includes, in response to the bypass control value being set to a second value indicating the FRC processing, generating an interpolation frame using the first video frame and a second video frame after the first video frame. The method includes displaying the first video frame, the interpolation frame, and the second video frame.

A non-transitory computer readable storage medium storing one or more programs, the one or more programs comprising instructions configured to, when executed by at least one processor of an electronic device, cause the electronic device to: obtain a first video frame and a bypass control value related to the first video frame from video data, determine whether to perform frame rate conversion (FRC) processing using the first video frame based on the bypass control value, in response to the bypass control value being set to a first value indicating bypass of the FRC processing, display the first video frame through the display module, in response to the bypass control value being set to a second value indicating the FRC processing, generate an interpolation frame using the first video frame and a second video frame after the first video frame, and display the first video frame, the interpolation frame, and the second video frame through the display module.

DETAILED DESCRIPTION

Figure 1:
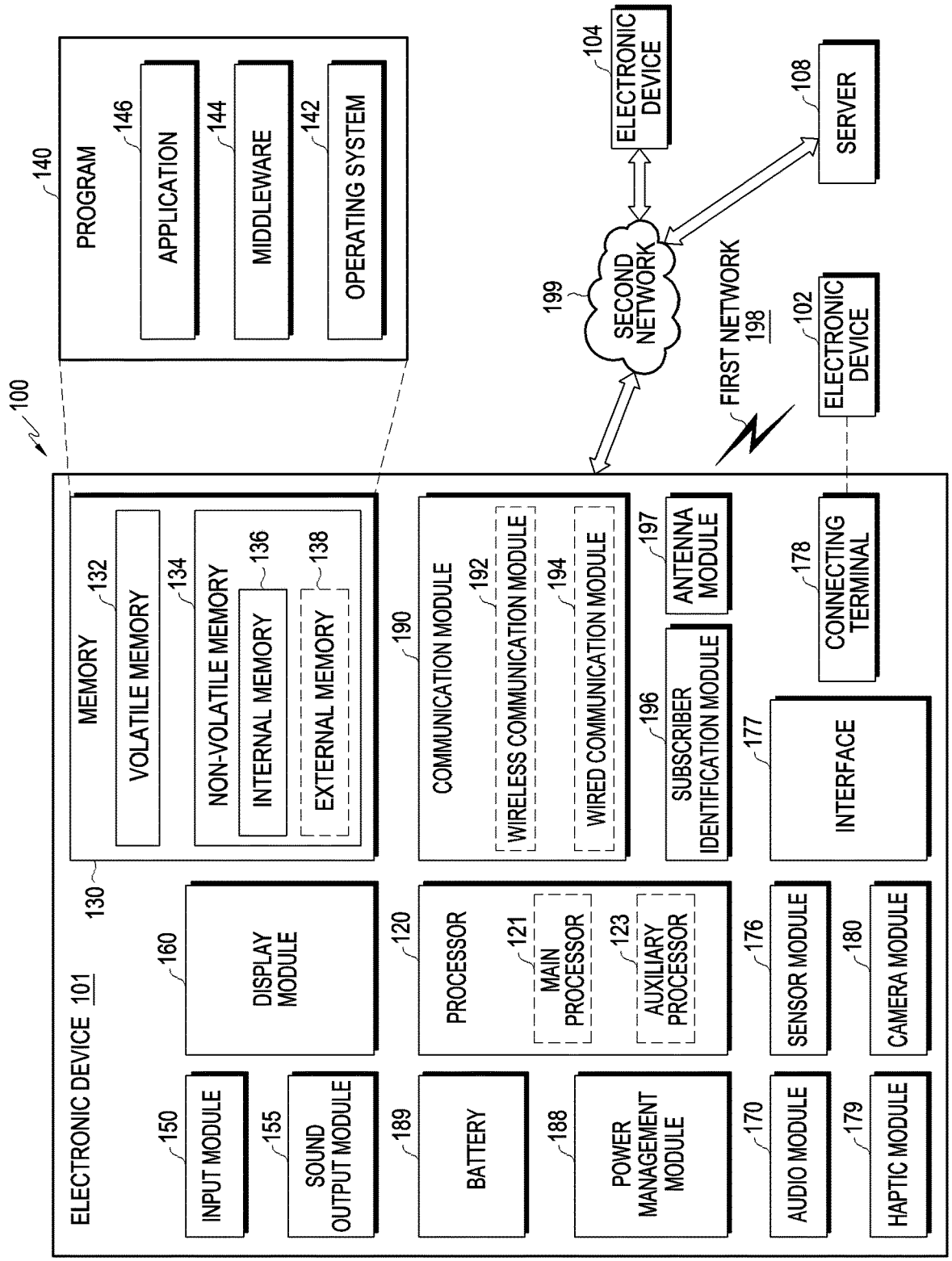
FIG. 1 is a schematic view illustrating an electronic device in a network environment according to various embodiments.

Hereinafter, embodiments of the disclosure are described with reference to the accompanying drawings. When determined to make the subject matter of the disclosure unclear in describing embodiments, the detailed description of the known art or functions may be skipped. The terms as used herein are defined considering the functions in the present disclosure and may be replaced with other terms according to the intention or practice of the user or operator. Therefore, the terms should be defined based on the overall disclosure.

The terms as used herein are provided merely to describe some embodiments thereof, but do not limit embodiments of the disclosure. The terms as used herein are provided merely to describe some embodiments thereof, but not to limit the scope of other embodiments of the present disclosure. Unless otherwise defined, all terms including technical and scientific terms used herein have the same meaning as commonly understood by one of ordinary skill in the art to which the embodiments of the disclosure pertain and should not be interpreted as overly broad or narrow. As used herein, terms wrong or inappropriate for representing the spirit of the disclosure may be replaced with and understood as more proper ones to represent the spirit of the disclosure by one of ordinary skill in the art. General terms as used herein should be interpreted in the context of the specification or as defined in dictionaries.

As used herein, the singular forms "a," "an," and "the" may include the plural forms as well, unless the context clearly indicates otherwise. As used herein, the term "comprise," "include," or "have" should be appreciated not to preclude the presence or addability of features, numbers, steps, operations, components, parts, or combinations thereof as set forth herein.

As used herein, the terms "first" and "second" may be used to describe various components, but the components should not be limited by the terms. The terms are used to distinguish one component from another. For example, a first component may be denoted a second component, and vice versa without departing from the scope of the present disclosure.

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when a component is "directly connected to" or "directly coupled to" another component, no other intervening components may intervene therebetween.

Hereinafter, embodiments of the disclosure will be described in detail with reference to the accompanying drawings. The same reference denotations may be used to refer to the same or substantially the same elements throughout the specification and the drawings. No duplicate description of the same elements is given herein. When determined to make the subject matter of the disclosure unclear, the detailed description of the known art or functions may be skipped. The accompanying drawings are provided for an easier understanding of the embodiments of the disclosure but the disclosure should not be limited thereby. It should be interpreted that the spirit of the disclosure may encompasses all other changes, equivalents, or replacements of those shown in the drawings.

A terminal is described herein with reference to the drawings. However, the mobile station may also be referred to as an electronic device, mobile station (MS), mobile equipment (ME), user equipment (UE), user terminal (UT), subscriber station (SS), wireless device, handheld device, or access terminal (AT). Further, the terminal may be a device with communication functionality, such as a mobile phone, personal digital assistant (PDA), smartphone, wireless modem, or laptop computer.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or application-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

In an embodiment, frame rate conversion (FRC) processing performed in a video display device, such as the display module 160 of the electronic device 101, may include generating interpolation frames for input video frames. Performing FRC processing on all input video frames may cause high battery consumption in terms of power consumption. For example, the mobile electronic device may perform FRC processing through an auxiliary processing unit, such as a graphic processing unit (GPU), a digital signaling processor (DSP), or a neural processing unit (NPU), and FRC processing in the auxiliary processing unit may consume excessive power. For example, when FRC is applied to video frames having a high frame rate in a video stream having a different playback rate for each section, excessive power consumption may occur. Further, due to the time for preparing a system resource (e.g., a GPU resource) for performing FRC processing, the time at which the video is displayed is delayed, causing inconvenience to the user.

Figure 2A:
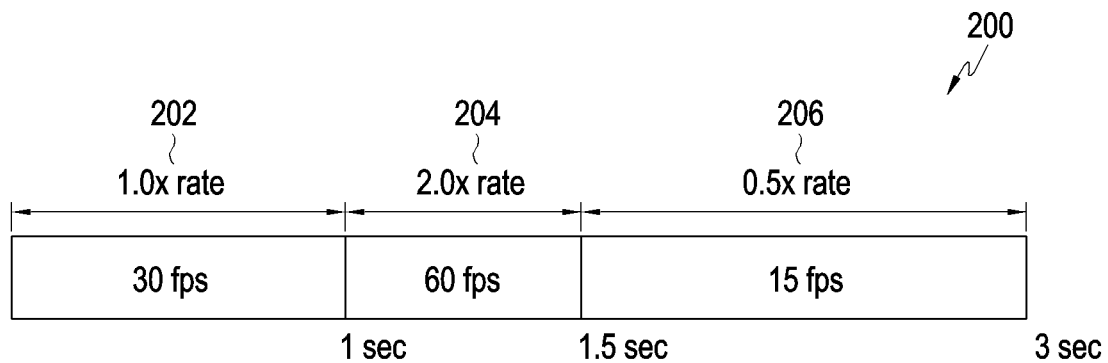
FIG. 2A is a schematic view illustrating a configuration of video data having a variable frame rate according to an embodiment.

FIG. 2A is a schematic view illustrating a configuration of video data having a variable frame rate according to an embodiment.

Referring to FIG. 2A, video data 200 (e.g., a video file) may be configured as a video stream including a plurality of video frames. For example, the video stream may include video data 202 of a first section, video data 204 of a second section, and video data 206 of a third section. In an embodiment, 1× playback rate, 2× playback rate, and 0.5× playback rate may be designated to the video data 202 of the first section, the video data 204 of the second section, and the video data 206 of the third section, respectively. In an embodiment, the video data 202 of the first section may include video frames for a 1.0× playback rate (e.g., 30 FPS), the video data 204 of the second section may include video frames for a 2.0× playback rate (e.g., 60 FPS), and the video data 206 of the third section may include video frames for a 0.5× playback rate (e.g., 15 FPS).

In an embodiment, the electronic device (e.g., the electronic device 101) may apply a different playback rate to each section based on the playback section information for the video data 200 and playback the video data 200. In an embodiment, the playback section information may represent the playback rate corresponding to each section (e.g., the first section, the second section, and the third section). In an embodiment, the electronic device 101 may decode the video data 202 of the first section at 30 FPS, decode the video data 204 of the second section at 60 FPS, and decode the video data 206 of the third section at 15 FPS.

As an example, when the video data 206 of the third section having a 0.5× playback rate is decoded at 15 FPS, the playback quality is degraded, so that the user may feel an image drop. The electronic device 101 may increase output FPS by applying FRC to up-convert, e.g., 0.5× playback rate.

Figure 2B:
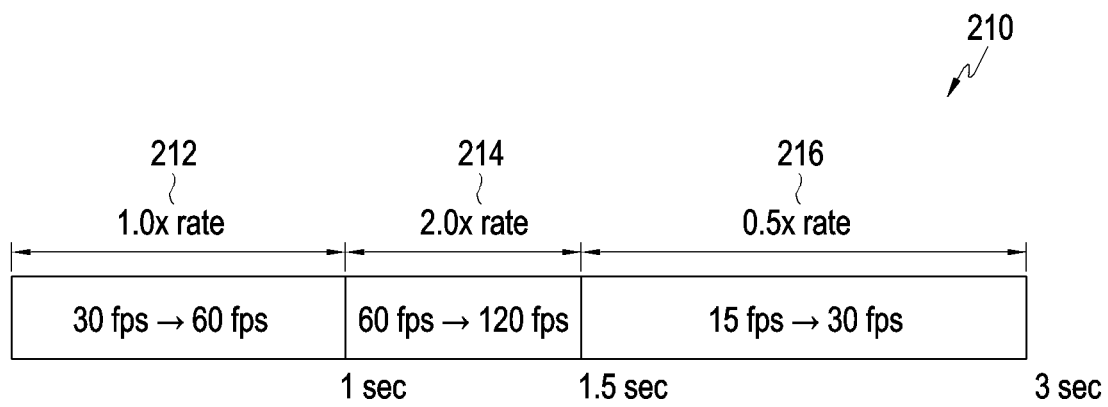
FIG. 2B is a schematic view illustrating playback of video data using FRC according to an embodiment.

FIG. 2B is a schematic view illustrating the playback of video data using FRC according to an embodiment.

Referring to FIG. 2B, the video data 210 (e.g., video file) may include video data 202 of the first section for the 1× playback rate (30 FPS), video data 204 of the second section for the 2× playback rate (60 FPS), and video data 206 of the third section for the 0.5× playback rate (15 FPS). The electronic device 101 may use FRC to enhance the playback quality of the video data 210. The electronic device 101 may apply FRC to the video data 216 of the third section for the 0.5× playback rate and play back the video data 216 at 30 FPS, thereby enhancing playback quality. In an embodiment, the electronic device 101 may apply FRC to the entire video data 210 without differentiating between the sections having different frame rates, so that the video data 214 of the second section corresponding to the 2× playback rate may be played back at 120 FPS by FRC. As the electronic device 101 generates 60 interpolation frames per second to convert the video data 214 of the second section into 120 FPS, the electronic device 101 may consume excessive power. Further, the electronic device 101 may fail to generate 60 interpolation frames per second according to the processing performance of FRC.

In an embodiment, as it takes time for the electronic device 101 to prepare a system resource (e.g., GPU resource) for FRC, the time when the electronic device 101 plays back video data (e.g., video data 210) may be delayed. As an example, when FRC is not applied, the electronic device 101 may start playing back the video data 210 within 100 ms after the user requests to play back the video data

210. However, when FRC is applied, the electronic device 101 may require more time (e.g., 600 ms) to start the playback of the video data 210 (e.g., the video data 214 of the second section). Thus, the user may feel video playback delayed and thus uncomfortable.

Figure 3:
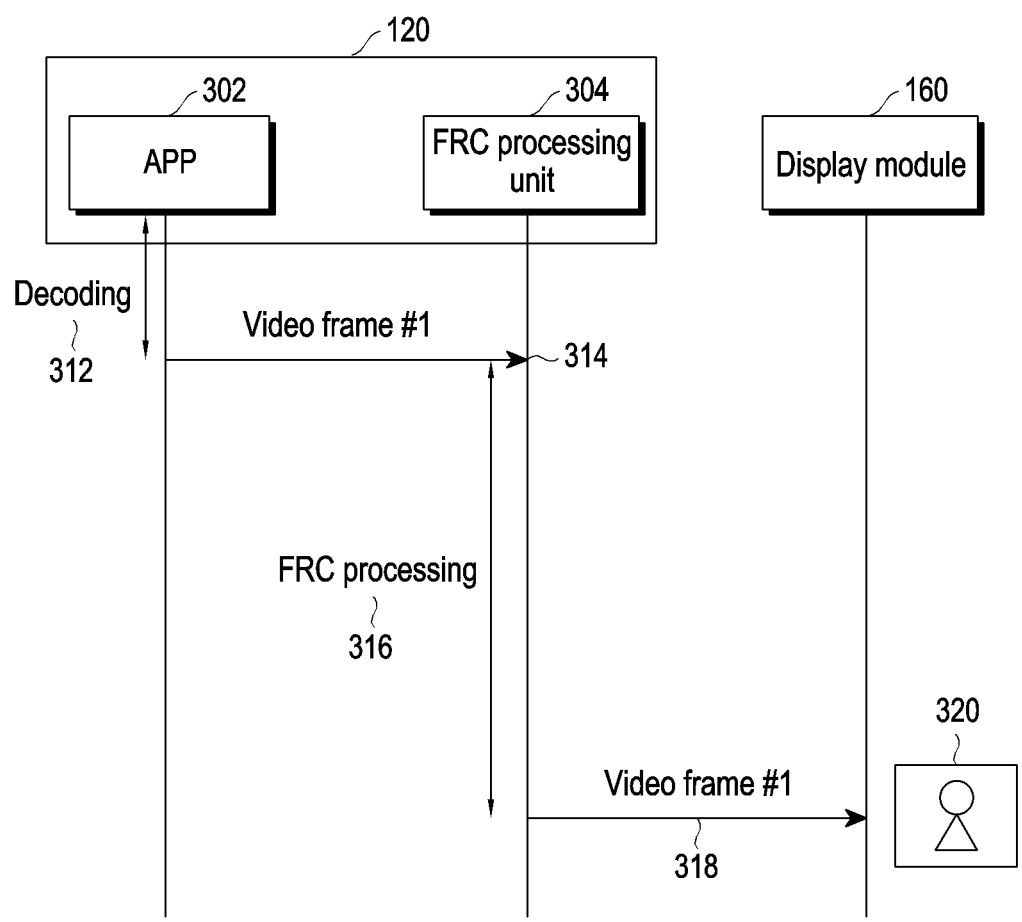
FIG. 3 is a schematic view illustrating a time taken until a first video frame is displayed when FRC is used according to an embodiment.

FIG. 3 is a schematic view illustrating the time taken until a first video frame is displayed when FRC is used according to an embodiment. In an embodiment, the processor 120 of the electronic device 101 may include (or execute) at least one application 302 to decode video data and an FRC processing unit 304 performing FRC processing (e.g., generating interpolation frames based on input video frames) for video frames. The processor 120 may output video frames (e.g., input video frames and interpolation frames) to the display module 160.

Referring to FIG. 3, in operation 312, the processor 120 (e.g., application 302) may take a first time (e.g., 100 ms) to decode video data (e.g., video data 210) to obtain video frame #1. In operation 314, the processor 120 (e.g., application 302) may transfer video frame #1 to the FRC processing unit 120. In an embodiment, the FRC processing unit 120 may be included in the GPU.

In operation 316, the processor 120 (e.g., FRC processing unit 120) may prepare (e.g., processor initialization and/or resource allocation) for FRC processing of video frame #1 and perform FRC processing (e.g., generating an interpolation frame based on video frame #1 and the previous or subsequent video frame). In an embodiment, it may take a second time (e.g., 500 ms) to prepare for the FRC processing and/or to perform FRC processing.

In operation 318, the processor 120 (e.g., the FRC processing unit 120) may transfer video frame #1 to the display module 160. In operation 320, the display module 160 may display video frame #1.

As described above, when FRC is used, a predetermined time (e.g., 600 ms) may be required until the first video frame (e.g., video frame #1) of video data (e.g., video data 210) is displayed on the screen by the display module 160.

Figure 4:
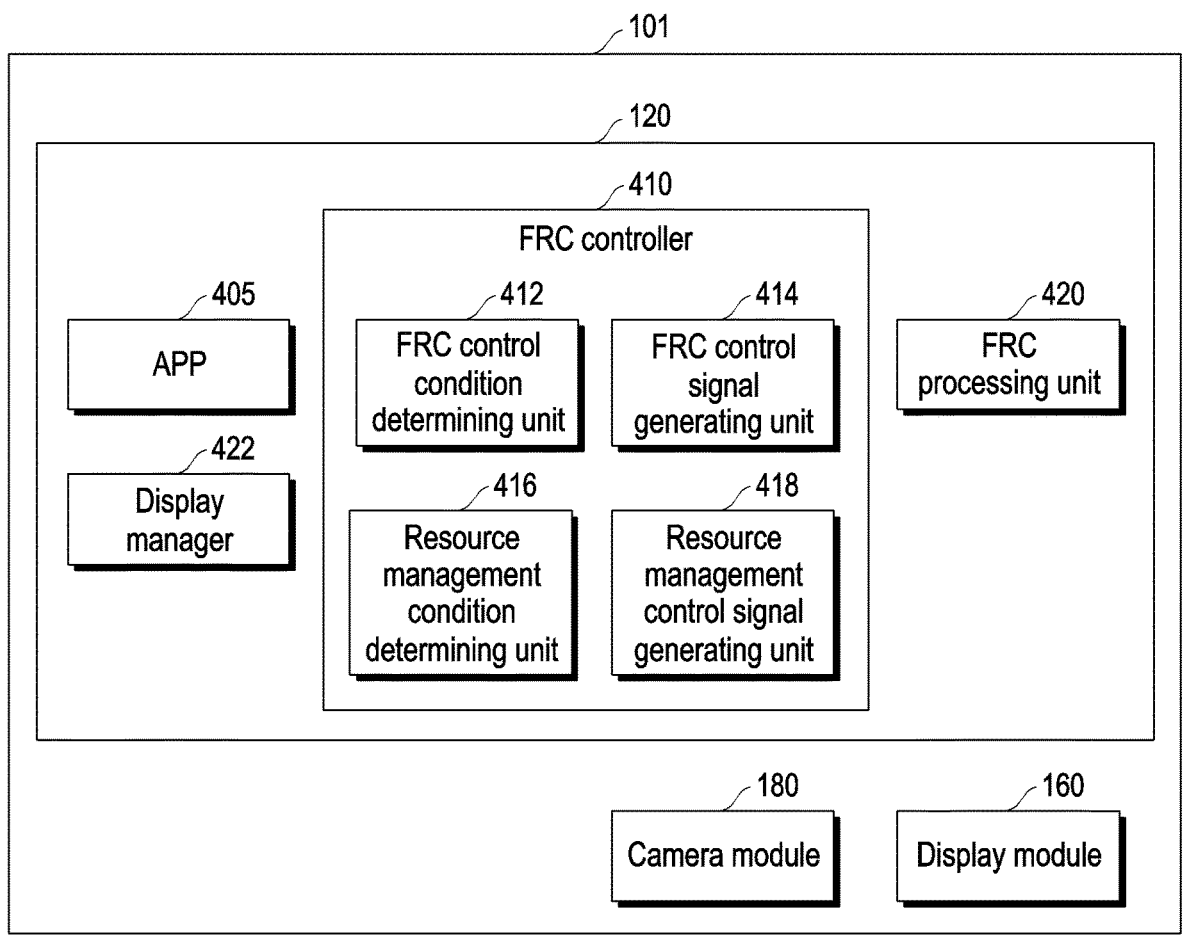
FIG. 4 is a schematic view illustrating a configuration of an electronic device processing video using FRC according to an embodiment.

FIG. 4 is a schematic view illustrating a configuration of an electronic device processing video using FRC according to an embodiment.

Referring to FIG. 4, the processor 120 of the electronic device 101 may include at least one application ('APP') 405, an FRC controller 410, and an FRC processing unit 420. In an embodiment, the application 405 and the FRC controller 410 may be components (e.g., software) included in the main processor 121 (e.g., an application processor) of the electronic device 101. For example, the operations of the application 405 and the FRC controller 410 may be understood as the operation of the main processor 121. In an embodiment, the FRC processing unit 420 may be a component (e.g., software or hardware) included in the auxiliary processor 123 (e.g., GPU) of the electronic device 101. For example, the operation of the FRC processing unit 420 may be understood as the operation of the auxiliary processor 123 (e.g., GPU). In an embodiment, the electronic device 101 may further include a display manager 422 that manages the display module 160. The display manager 422 may manage the state (e.g., size, and/or position) of the screen area displayed on the display module 160 by the application 405 and may notify the application 405 or the FRC controller 410 that the state of the screen area is changed.

In embodiment, the electronic device 101 may further include the display module 160 that receives the output video frames (e.g., input video frames and interpolation frames) FRC-processed by the FRC processing unit 420 from the application 405 and displays the output video frames. In an embodiment, the electronic device 101 may further include a camera module 180 that captures video frames and provides them to the application 405. The application 405 may FRC-process the input video frames received from the camera module 180 by the FRC processing unit 420 and store the input video frames and interpolation frames in the video data.

According to an embodiment, the application 405 may be software capable of using FRC processing. In an embodiment, the application 405 may be a video player that decodes video data to generate video frames and plays back the video frames at a designated frame rate on the display module 160. In an embodiment, the application 405 may be a video transcoder that converts the format (e.g., codec and/or frame rate) of video data. In an embodiment, the application 405 may be a video recorder that stores the video frames captured by the camera module 180 at a designated frame rate.

In an embodiment, the application 405 may generate a bypass control value for each video frame based on the playback section information about the video data. In an embodiment, for video frames of an FRC required section (e.g., video data 206 of the third section), the application 405 may generate bypass control values set as a first value (e.g., 'FALSE') indicating FRC processing and attach (or include) to each video frame. In an embodiment, for video frames of a section not requiring FRC (e.g., video data 204 of the second section), the application 405 may generate bypass control values set as a value (e.g., 'TRUE') indicating a bypass of FRC processing and attach (or include) to each video frame.

According to an embodiment, the FRC controller 410 may support dynamic generation of interpolation frames by the FRC processing unit 420 and control the FRC processing unit 420 to efficiently use limited resources of the FRC processing unit 420. In an embodiment, the FRC controller 410 may include at least one of a FRC control condition determining unit 412, an FRC control signal generating unit 414, a resource management condition determining unit 416, or a resource management control signal generating unit 418. Embodiments for dynamically controlling FRC processing by the FRC controller 410 is described below in detail.

In an embodiment, the FRC control condition determining unit 412 may determine whether to bypass FRC processing for video frames input from the application 405. In an embodiment, the FRC control condition determining unit 412 may transfer the input video frames to the FRC processing unit 420 and transmit the interpolation frames, generated using the input video frames by the FRC processing unit 420, to the application 405. The input video frames and/or the interpolation frames may be transferred between the FRC control condition determining unit 412 and the FRC processing unit 420 directly or through the FRC control signal generating unit 414.

In an embodiment, the FRC control signal generating unit 414 may generate a control signal (e.g., init, start, or stop signal) for controlling the FRC processing unit 420 according to the determination result of the FRC control condition determining unit 412. In an embodiment, the resource management condition determining unit 416 may determine whether the FRC processing unit 420 has a resource (e.g., a GPU resource) capable of performing FRC. In an embodiment, the resource management control signal generating unit 418 may generate a control signal (e.g., resource allocation, release, or recovery) for controlling resource allocation of the FRC processing unit 420 according to the result of determination by the resource management condition determining unit 416.

In an embodiment, the FRC processing unit 420 may generate at least one interpolation frame using at least two video frames among the input video frames received from the application 405 through the FRC controller 410. The FRC processing unit 420 may transmit the interpolation frame to the FRC controller 410. The FRC controller 410 may transmit the input video frames and the output video frames including the interpolation frame to the application 405 in the order of the corresponding time stamps.

Figure 5:
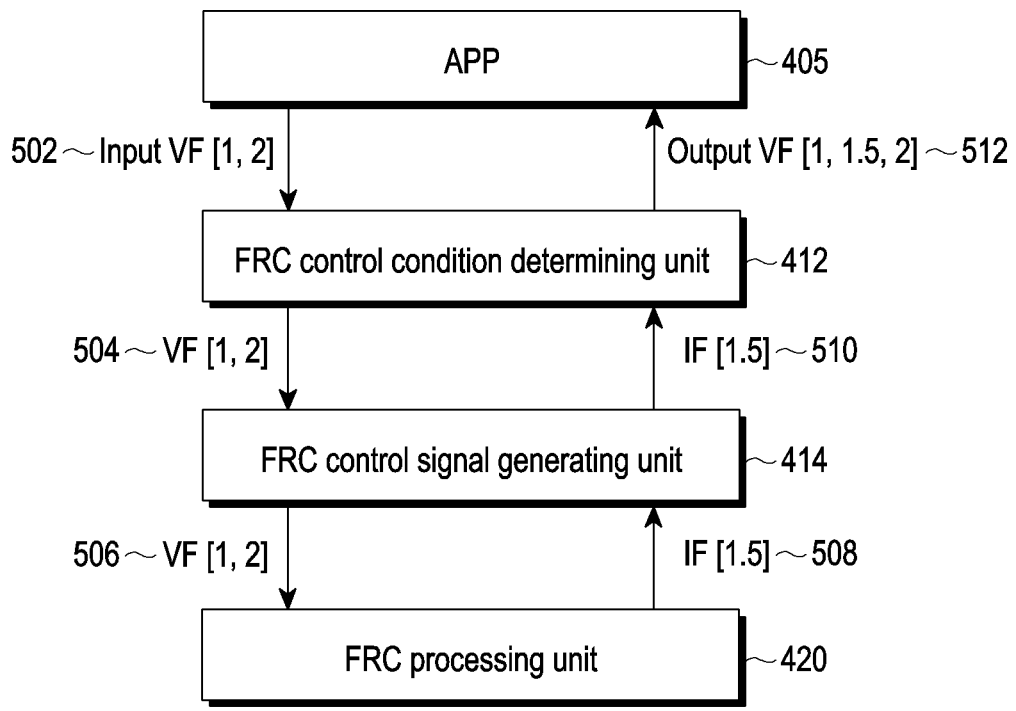
FIG. 5 is a schematic view illustrating an operation of dynamically controlling FRC processing according to an embodiment.

FIG. 5 is a schematic view illustrating an operation of dynamically controlling FRC processing according to an embodiment.

Referring to FIG. 5, the application 405 may decode the stored video data to generate decoded video frames or obtain video frames captured by the camera module (e.g., the camera module 180). In operation 502, the application 405 may transfer the video frames (hereinafter, referred to as input video frames), along with the bypass control value for each video frame, to the FRC control condition determining unit 412 to generate interpolation frames through FRC processing on the video frames.

In an embodiment, the application 405 may determine the bypass control value based on the playback rate (e.g., 1×, 2×, or 0.5× of FIG. 2A) per section of the video data. In an embodiment, the application 405 may decode the video data 202 of the first section to obtain the video frames of the first section and input each video frame of the first section, along with the bypass control value, to the FRC control condition determining unit 412. The application 405 may generate each video frame obtained from the video data 204 of the second section and the bypass control value corresponding thereto and each video frame obtained from the video data 206 of the third section and the bypass control value corresponding thereto. In an embodiment, the bypass control value corresponding to each video frame of the first section (1× rate) may be set to FALSE indicating to perform FRC processing. In an embodiment, the bypass control value corresponding to the video frames of the second section (2× rate) may be set to TRUE indicating to bypass FRC processing. In an embodiment, the bypass control value corresponding to the video frames of the third section (0.5× rate) may be set to FALSE indicating to perform FRC processing.

In an embodiment, in operation 502, the FRC control condition determining unit 412 may receive input video frames (e.g., input video frame [1,2]) and bypass control value from the application 405 and determine whether generation of an interpolation frame through FRC processing is needed based on the bypass control value. Based on the bypass control value indicating to generate an interpolation frame (e.g., when set to FALSE), in operation 504, the FRC control condition determining unit 412 may transfer the input video frames (e.g., input video frame [1,2]) to the FRC control signal generating unit 414. In operation 506, the FRC control signal generating unit 414 may transfer the input video frames (e.g., input video frame [1,2]) to the FRC processing unit 420. In operation 508, the FRC control signal generating unit 414 may receive the interpolation frames (e.g., interpolation frame [1.5]) generated as a result of FRC processing from the FRC processing unit 420. In an embodiment, the interpolation frame [1.5] may be generated through FRC processing using input video frame 1 and input video frame 2.

In operation 510, the FRC control signal generating unit 414 may transmit the interpolation frames (e.g., interpolation frame [1.5]) to the FRC control condition determining unit 412. In operation 512, the FRC control condition determining unit 412 may transfer the input video frames received in operation 502 and the output video frames (e.g., output video frame [1, 1.5, 2]) including the interpolation frames to the application 405.

Transmission of a video frame between components mentioned in the embodiments of the disclosure may include direct transmission of the data of the video frame or transmission of the location (e.g., address in buffer) where the video frame is stored. Likewise in the embodiments described below, transmission of a video frame or interpolation frame may be interpreted as transmission of the address where the video frame or interpolation frame is stored.

In an embodiment, the application 405 and the FRC controller 410 may share the buffer queue and, in operation 502, the application 405 may transfer the address of a specific video frame (e.g., input video frame [1,2]) stored in the buffer queue to the FRC controller 410. In an embodiment, the FRC controller 410 and the FRC processing unit 420 may share the buffer queue and, in operation 506, the FRC control signal generating unit 414 in the FRC controller 410 may transfer the address of the specific video frame (e.g., input video frame [1,2]) stored in the buffer queue to the FRC processing unit 420. The FRC processing unit 420 may generate an interpolation frame (e.g., interpolation frame [1.5]) using the video frames (e.g., input video frame [1,2]) read from the buffer queue based on the address, store the generated interpolation frame in the buffer queue or another memory and, in operation 508, transmit the address of the location in the memory where the interpolation frame is stored to the FRC controller 410. In operation 512, the FRC control condition determining unit 412 of the FRC controller 410 may transfer the address of the input video frame [1,2] and the address of the interpolation frame [1.5] to the application 405.

Figure 6:
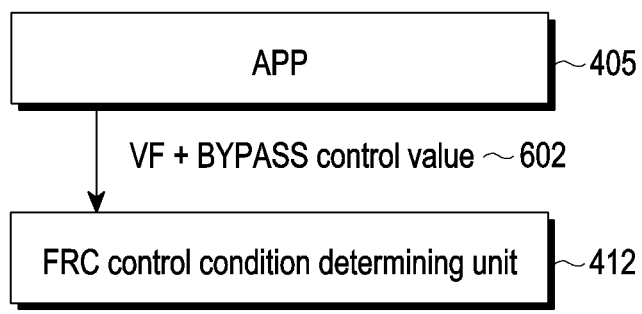
FIG. 6 is a schematic view illustrating an operation of dynamically generating an interpolation frame based on a bypass control value according to an embodiment.

FIG. 6 is a schematic view illustrating an operation of dynamically generating an interpolation frame based on a bypass control value according to an embodiment.

Referring to FIG. 6, the FRC control condition determining unit 412 may receive an input video frame and a bypass control value 602 corresponding thereto from the application 405.

In an embodiment, the bypass control value 602 may be transferred together with the input video frame in the following format.

queueInputBuffer(char*buffer, bool byPass);

Here, 'char*buffer' may mean the input video frame or the buffer address where the input video frame is stored, and 'byPass' may mean the bypass control value (e.g., a Boolean value).

In an embodiment, the bypass control value 602 may be transferred together with the input video frame in the following format.

struct Buffer{
char*data;
bool bypass;
};
queueInputBuffer(Buffer*buffer)

In an embodiment, the bypass control value 602 may be transferred together with the input video frame in the following format.

queueInputBuffer(Message*message);
bool byPass;
message->read("bypass", &byPass); In an embodiment, the FRC control condition determining unit 412 may identify the bypass control value from 'byPass' included in a message object having a structure including a key and a value.

In an embodiment, the application 405 may transfer the bypass control value to the FRC controller 410 whenever transferring the video frame. As an example, all video frames included in the video data 204 of the second section, together with the bypass control values set to TRUE, may be transferred to the FRC controller 410. In an embodiment, all video frames included in the video data 206 of the third section, together with the bypass control values set to FALSE, may be transferred to the FRC controller.

In an embodiment, the application 405 may transfer the bypass control value along with the video frame to the FRC controller 410 when changing the bypass condition of FRC processing (e.g., upon starting or ending FRC bypass). In an embodiment, the first video frame of the video data 204 of the second section, along with the bypass control value set to TRUE, may be transferred to the FRC controller 410, and the second and subsequent video frames may be transferred without a bypass control value. In an embodiment, the first video frame of the video data 206 of the third section, along with the bypass control value set to FALSE, may be transferred to the FRC controller 410, and the second and subsequent video frames may be transferred without a bypass control value.

In an embodiment, the bypass control value may be set based on playback section information about the video data (e.g., the video data 200). In an embodiment, the application 405 may not apply FRC bypass to the video data 202 of the first section and transfer the bypass control value set to TRUE, along with the first video frame of the video data 204 of the second section, to the FRC controller 410. In an embodiment, the second and subsequent video frames of the video data 204 may be transferred to the FRC controller 410 without a bypass control value. In an embodiment, the application 405 may transfer the bypass control value set to FALSE, along with the first video frame of the video data 206 of the third section, to the FRC controller 410. In an embodiment, the second and subsequent video frames of the video data 206 may be transferred to the FRC controller 410 without a bypass control value.

Figure 7:
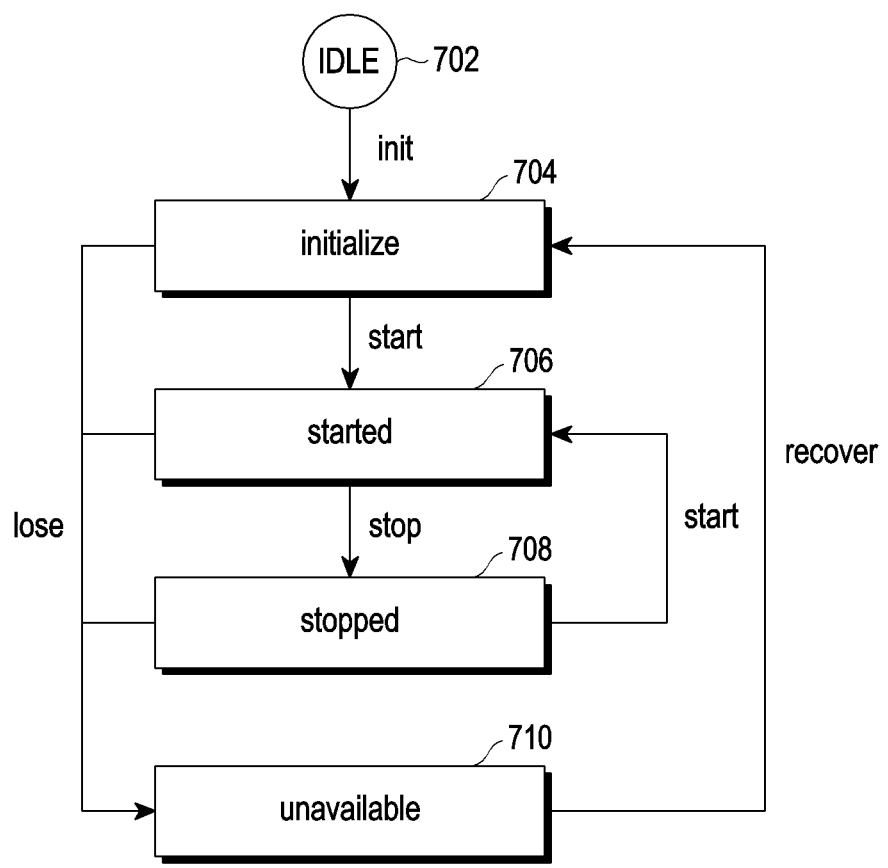
FIG. 7 is a schematic view illustrating a state switch for managing the state of an FRC processing unit according to an embodiment.

FIG. 7 is a schematic view illustrating a state switch for managing the state of an FRC processing unit 420 according to an embodiment.

Referring to FIG. 7, the states of the FRC processing unit 420 may include an idle state 702, an initialized state 704, a started state 706, a stopped state 708, and an unavailable state 710.

Table 1 below describes the states used by the FRC control signal generating unit 410 for management of the FRC processing unit 420.

TABLE 1

| State | Description |
|---|---|
| idle | when FRC resource is not allocated |
| initialized | when FRC resource is allocated and is prepared |
| started | FRC mode |
| stopped | bypass mode |
| unavailable | when FRC resource is released |

In an embodiment, the FRC control signal generating unit 414 may manage the states of the FRC processing unit 420 based on the signals communicated with the FRC control condition determining unit 412 and the signals communicated with the resource management condition determining unit 416.

In an embodiment, the initialized state 704 may be entered upon receiving an initialization (init) signal for the FRC processing unit 420 from the FRC control condition determining unit 412 by the FRC control signal generating unit 414 in the idle state 702 or upon receiving a signal indicating that the FRC resource is recovered through the resource management condition determining unit 416 from the FRC processing unit 420 after the FRC resource (e.g., process resource of the FRC processing unit 420) is released in the FRC processing unit 420. The initialized state 704 may mean a state in which the FRC processing unit 420 allocates the FRC resource for processing the video frames of the application 405 and completes the preparation for using the FRC resource.

In an embodiment, the started state 706 may be entered when the FRC control signal generating unit 414 receives a start signal for the FRC processing unit 420 from the FRC control condition determining unit 412 in the initialized state 704. In the started state, the FRC controller 410 may transfer the input video frames received from the application 405 to the FRC processing unit 420 to allow the FRC processing unit 420 to generate interpolation frames. The started state of the FRC processing unit 420 may be used when the FRC controller 410 operates in the FRC mode.

In an embodiment, the stopped state 708 may be entered when the FRC control signal generating unit 414 receives a stop signal for the FRC processing unit 420 from the FRC control condition determining unit 412 in the started state 706. In the stopped state, the FRC control signal generating unit 414 may empty the buffer queue (e.g., buffer storing video frames) referenced by the FRC control condition determining unit 412 and the FRC processing unit 420 to stop the FRC processing. The stopped state of the FRC processing unit 420 may be used when the FRC controller 410 operates in the bypass mode and prevent inefficient power consumption. If a start signal is received in the stopped state 708, the FRC control signal generating unit 414 may enter the started state 706.

In an embodiment, the unavailable state 710 may be entered when the FRC control signal generating unit 414 receives a release (lose) signal indicating to release the FRC resource from the resource management condition determining unit 416 while being in the initialized state 704, the started state 706, or the stopped state 708. Upon receiving a recovery signal in the unavailable state 710, the FRC control signal generating unit 414 may switch to the initialized state 704.

Figure 8:
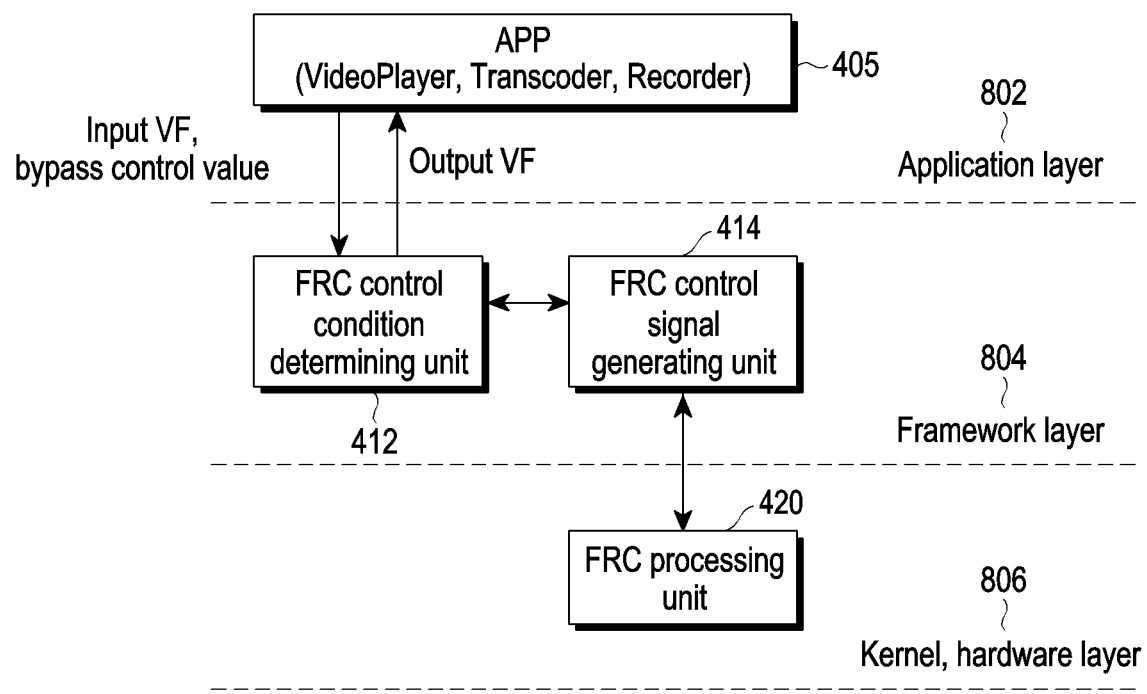
FIG. 8 is a schematic view illustrating a flow of input/output video frames for FRC according to an embodiment.

FIG. 8 is a schematic view illustrating a flow of input/output video frames for FRC according to an embodiment.

Referring to FIG. 8, the application 405 may be a video player, a video transcoder, or a video recorder that operates on the application layer 802 (e.g., the application layer of the processor 120) and may transmit input video frame-bypass control value pairs to the FRC control condition determining unit 412 and receive output video frames that may include interpolation frames and the input video frames from the FRC control condition determining unit 412.

The FRC control condition determining unit 412 and the FRC control signal generating unit 414 may operate on the framework layer 804 (e.g., the application layer of the processor 120). The FRC control condition determining unit 412 may dynamically determine whether to perform FRC processing based on the bypass control value received along with the input video frame from the application 405 and the setting of the bypass forced mode by the application 405 and control the FRC control signal generating unit 414.

The FRC processing unit 420 may operate on the kernel or hardware layer 806 (e.g., the kernel of the processor 120 or the auxiliary processor 123) and generate interpolation frames through FRC processing based on the signal received from the FRC control signal generating unit 414.

Figure 9:
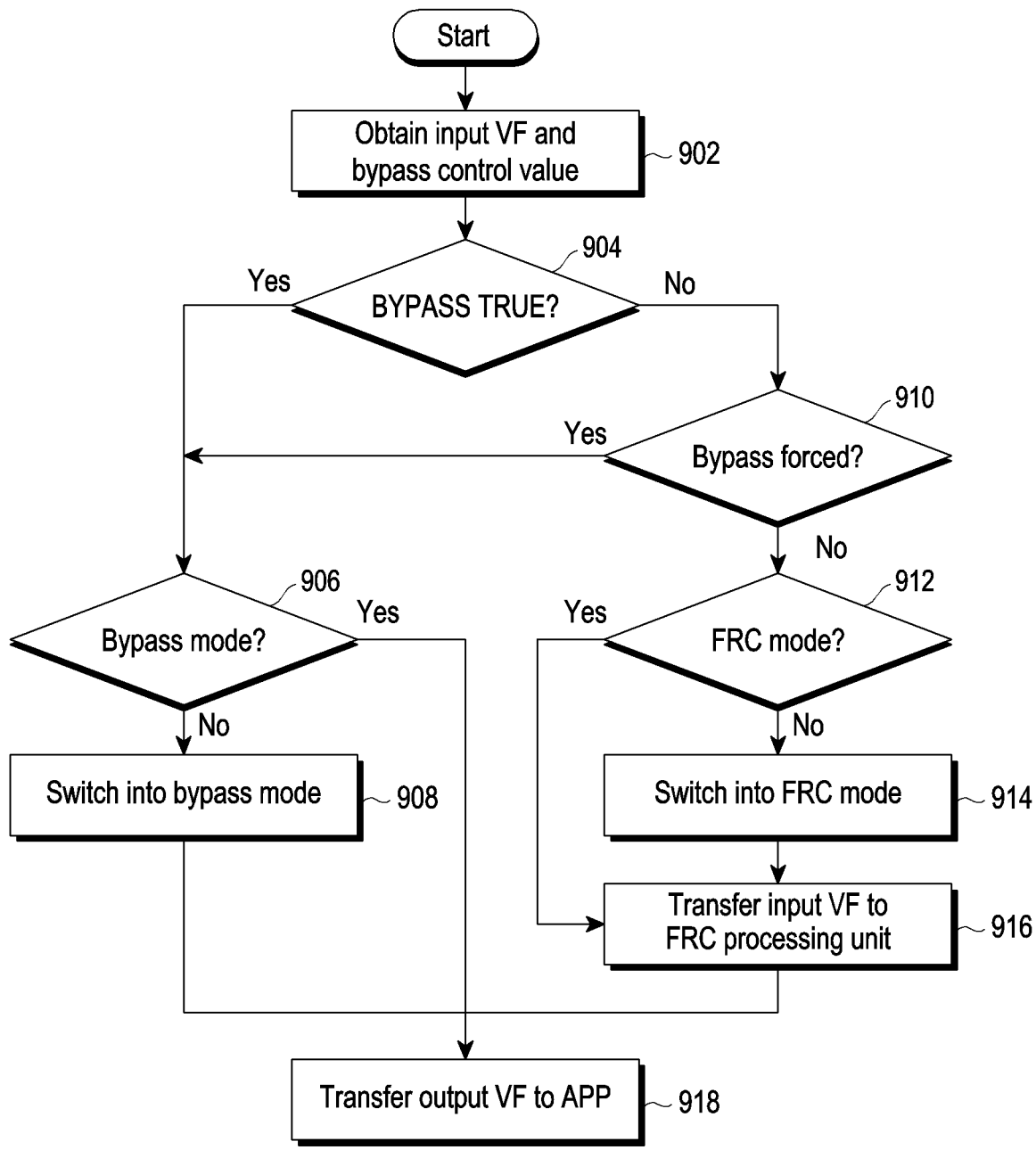
FIG. 9 is a flowchart illustrating processing of video data through FRC bypass control according to an embodiment.

FIG. 9 is a flowchart illustrating processing of video data through FRC bypass control according to an embodiment. At least one of the operations described below may be executed by the processor 120 (e.g., the FRC control condition determining unit 412) of the electronic device 101.

Referring to FIG. 9, in operation 902, the processor 120 (e.g., the FRC control condition determining unit 412) may obtain the bypass control value along with the input video frame (VF) from the application 405. In operation 904, the processor 120 (e.g., the FRC control condition determining unit 412) may determine whether the bypass control value is a value indicating to bypass FRC processing, e.g., TRUE and, if TRUE, proceed to operation 906 and, if not TRUE (e.g., if FALSE), proceed to operation 910. In an embodiment, operation 910 of determining the bypass forced setting may be omitted and, if 'no' in operation 904, the processor 120 (e.g., the FRC control condition determining unit 412) may proceed to operation 912.

In operation 906, the processor 120 (e.g., the FRC control condition determining unit 412) may identify whether the FRC controller 410 is set as the bypass mode. If already set as the bypass mode, the processor 120 (e.g., the FRC control condition determining unit 412) may proceed to operation 918. In contrast, unless set as the bypass mode, in operation 908, the processor 120 (e.g., the FRC control condition determining unit 412) may switch the FRC controller 410 to the bypass mode and then proceed to operation 918. In operation 918, the processor 120 (e.g., the FRC control condition determining unit 412) may transfer the output video frame, which includes the input video frame as it is, to the application 405 according to the bypass mode.

In operation 910, the processor 120 (e.g., the FRC control condition determining unit 412) may identify whether the bypass forced mode is set by the application 405. In an embodiment, the bypass forced mode may be set by a bypass forced setting signal received by the FRC control condition determining unit 412 from the application 405. If the bypass forced mode is set, the processor 120 (e.g., the FRC control condition determining unit 412) may proceed to operation 906. Unless the bypass forced mode is set, the processor 120 (e.g., the FRC control condition determining unit 412) may proceed to operation 912.

In operation 912, the processor 120 (e.g., the FRC control condition determining unit 412) may identify whether the FRC controller 410 is set as the FRC mode. If already set as the FRC mode, the processor 120 (e.g., the FRC control condition determining unit 412) may proceed to operation 916. In contrast, unless set as the FRC mode, in operation 914, the processor 120 (e.g., the FRC control condition determining unit 412) may switch the FRC controller 410 to the FRC mode and then proceed to operation 916. In operation 916, the processor 120 (e.g., the FRC control condition determining unit 412) may transfer the input video frame to the FRC processing unit 420, receive the interpolation frame generated based on the input video frame (and the previous or subsequent input video frame) from the FRC processing unit 420, and then proceed to operation 918. In operation 918, the processor 120 (e.g., the FRC control condition determining unit 412) may transfer output video frames including the interpolation frame and the input video frame to the application 405 according to the FRC mode.

In an embodiment, when using a different playback rate per section according to the playback section information about the video data, the application 405 may set a bypass control value for each section of the video data, and the FRC control condition determining unit 412 may determine the FRC mode or bypass mode using the bypass control value.

Figure 10:
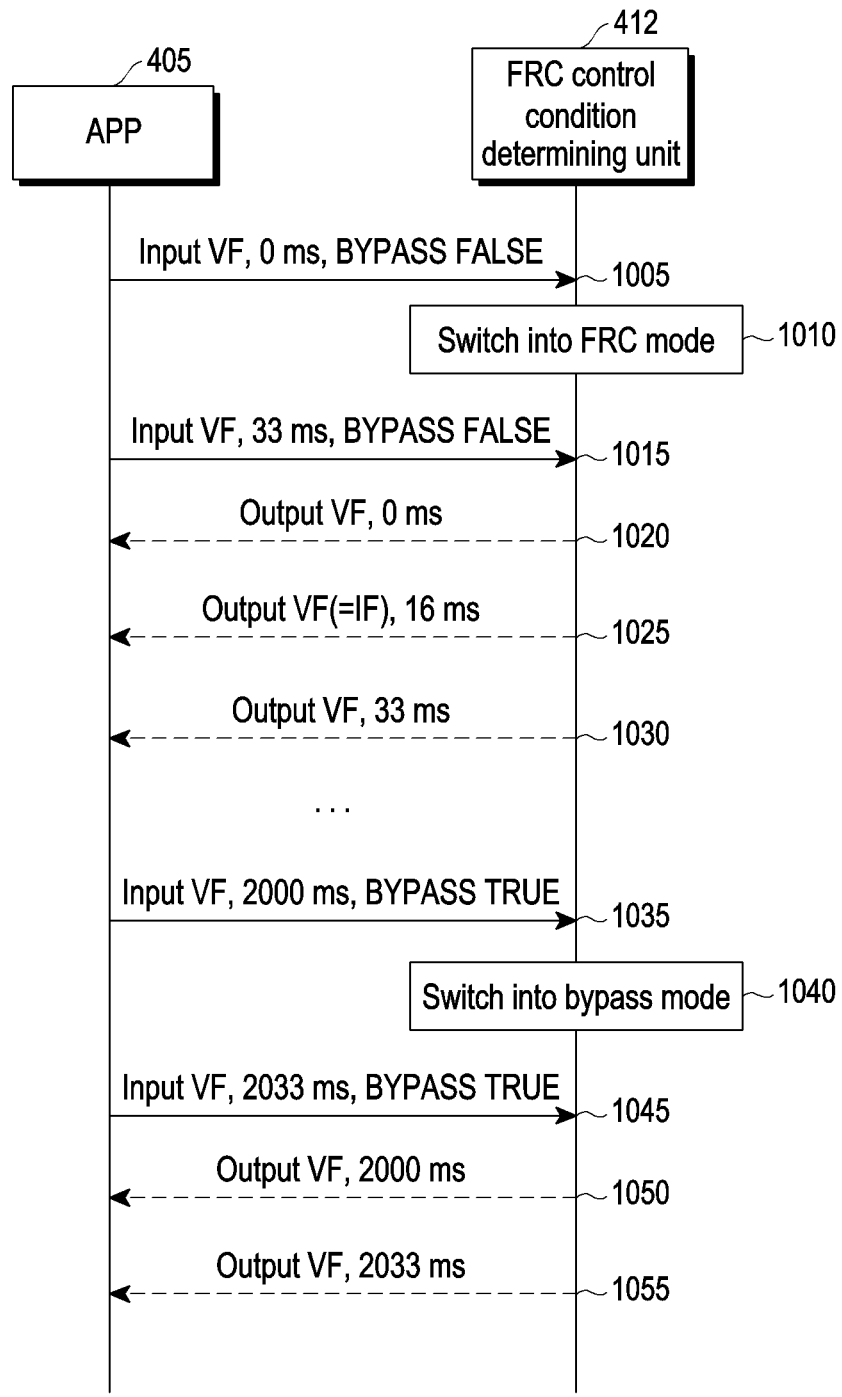
FIG. 10 is a signal flowchart illustrating an operation of processing video playback using FRC bypass on an application according to an embodiment.

FIG. 10 is a signal flowchart illustrating an operation of processing video playback using FRC bypass on an application according to an embodiment.

Referring to FIG. 10, the application 405 may identify playback section information about video data. In an embodiment, the playback section information about video data may be as shown in Table 2 below.

TABLE 2

| playback rate | timestamp |
| --- | --- |
| 0.5x rate | 0-1966 ms |
| 2.0x rate | 2000 ms and later |

In operation 1005, the application 405 may transmit the input video frame ('input VF, 0 ms') of timestamp 0 ms and the bypass control value set to FALSE ('BYPASS FALSE') to the FRC control condition determining unit 412. In operation 1010, the FRC control condition determining unit 412 may identify that the FRC controller 410 is not set as the FRC mode and switch to the FRC mode based on the bypass control value ('BYPASS FALSE').

In operation 1015, the application 405 may transmit the input video frame ('input VF, 33 ms') of timestamp 33 ms and BYPASS FALSE to the FRC control condition determining unit 412. The FRC control condition determining unit 412 may identify that the FRC mode is already set. In the FRC mode, the FRC control condition determining unit 412 may transfer input video frames (e.g., 'input VF, 0 ms' and 'input VF, 33 ms') to the FRC processing unit 420 and, in response thereto, receive the interpolation frame (e.g., interpolation frame of timestamp 16 ms 'IF, 16 ms') generated using the input video frames.

In operation 1020, the FRC control condition determining unit 412 may transfer the same output video frame ('output VF, 0 ms') as 'input VF, 0 ms' to the application 405. In operation 1025, the FRC control condition determining unit 412 may forward the output video frame ('output VF, 16 ms') including the interpolation frame 'IF, 16 ms' after 'output VF, 0 ms' to the application 405. In an embodiment, the interpolation frame 'IF, 16 ms' may include the scene between 'input VF, 0 ms' and 'input VF, 33 ms'. In operation 1030, the FRC control condition determining unit 412 may transfer the same video frame ('output VF, 33 ms') as 'input VF, 33 ms' to the application 405.

As in operations 1005 to 1030, the application 405 may set the BYPASS FALSE for the video frames of the 0-1966 ms section corresponding to 0.5× rate of the entire video data, obtaining interpolation frames and increasing the playback quality of video data.

In operation 1035, the application 405 may transmit the input video frame ('input VF, 2000 ms') of timestamp 2000 ms and the bypass control value set to TRUE ('BYPASS TRUE') to the FRC control condition determining unit 412. In operation 1040, the FRC control condition determining unit 412 may identify that the FRC controller 410 is set as the FRC mode and switch to the bypass mode based on the bypass control value ('BYPASS TRUE').

In operation 1045, the application 405 may transmit the input video frame ('input VF, 2033 ms') of timestamp 2033 ms and BYPASS TRUE to the FRC control condition determining unit 412. The FRC control condition determining unit 412 may identify that the bypass mode is already set. In the bypass mode, the FRC control condition determining unit 412 may not transfer the input video frames (e.g., 'input VF, 0 ms' and 'input VF, 33 ms') to the FRC processing unit 420.

In operation 1050, the FRC control condition determining unit 412 may transfer the same video frame ('output VF, 2000 ms') as 'input VF, 2000 ms' to the application 405. In operation 1055, the FRC control condition determining unit 412 may transfer the same video frame ('output VF, 2033 ms') as 'input VF, 2033 ms' to the application 405.

As in operations 1035 to 1055, the application 405 may set BYPASS TRUE for the video frames of the 2000 ms and later section corresponding to 2× rate of the entire video data, preventing the FRC processing unit 420 from operating during the 2000 ms and later section and saving the power consumption of the electronic device 101.

Figure 11:
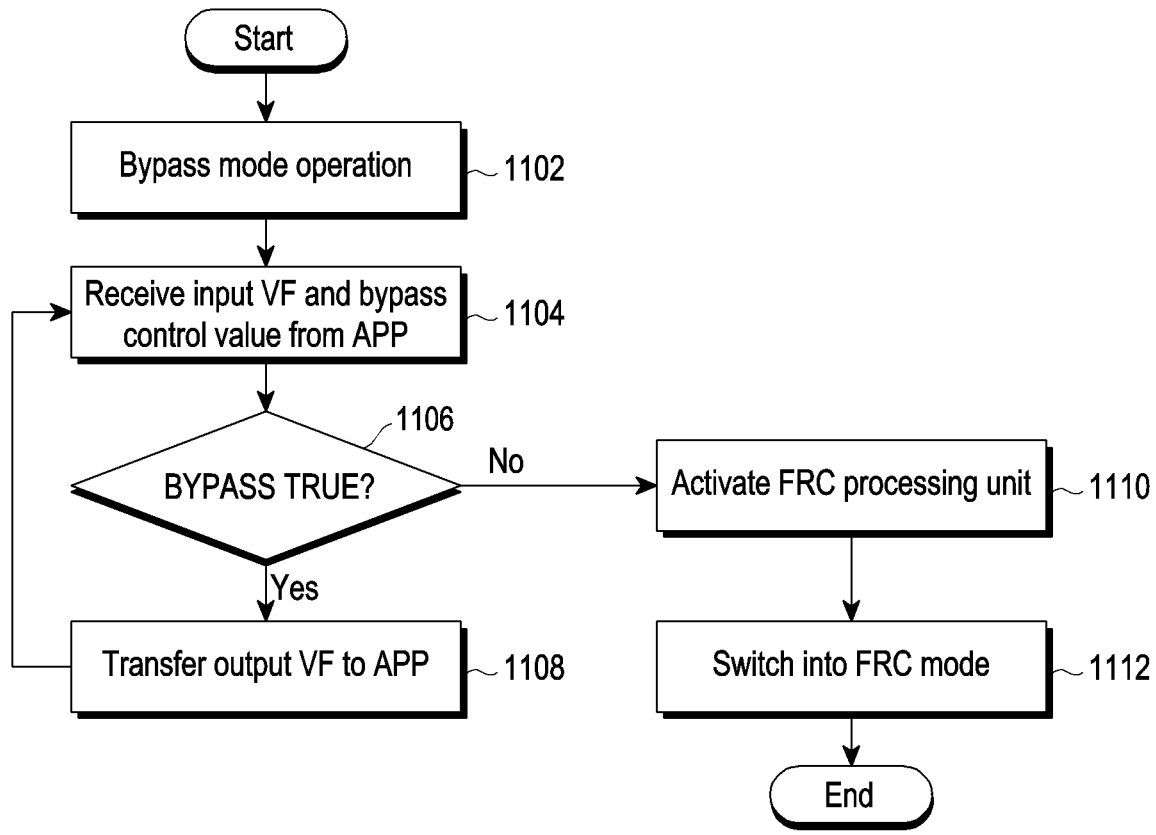
FIG. 11 is a flowchart illustrating an operation of a bypass mode for FRC processing according to an embodiment.

FIG. 11 is a flowchart illustrating an operation of a bypass mode for FRC processing according to an embodiment. At least one of the operations described below may be executed by the processor 120 (e.g., the FRC control condition determining unit 412) of the electronic device 101.

Referring to FIG. 11, in operation 1102, the processor 120 (e.g., the FRC control condition determining unit 412) may be operating in the bypass mode in response to the bypass control value set to TRUE, received from the application 405. In operation 1104, the processor 120 (e.g., the FRC control condition determining unit 412) may receive the input video frame and the bypass control value from the application 405, in a state in which the bypass mode is set. In operation 1106, the processor 120 (e.g., the FRC control condition determining unit 412) may identify whether the bypass control value received together with the input video frame is set to TRUE. If the bypass control value is set to TRUE, the processor 120 (e.g., the FRC control condition determining unit 412) may proceed to operation 1108 and may otherwise (e.g., if set to FALSE) proceed to operation 1110.

In operation 1108, the processor 120 (e.g., the FRC control condition determining unit 412) may designate the input video frame as an output video frame and copy it and transfer it to the application 405.

In operation 1110, the processor 120 (e.g., the FRC control condition determining unit 412) may activate (e.g., transmission of a start signal and allocation of an FRC resource) the FRC processing unit 420 and, in operation 1112, switch the FRC controller 410 to the FRC mode. In an embodiment, the FRC processing unit 420 may switch to the started state.

Figure 12:
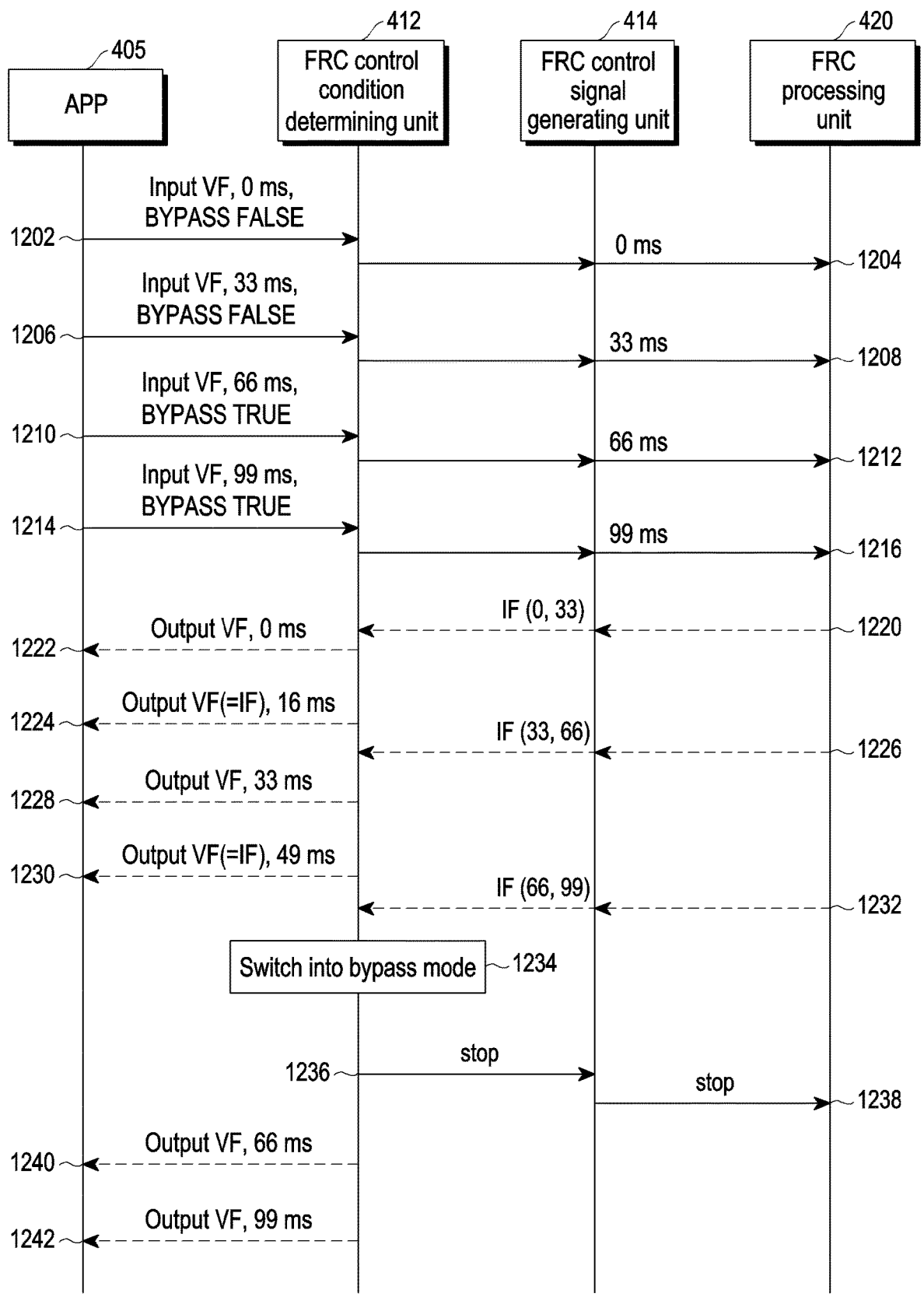
FIG. 12 is a signal flowchart illustrating a procedure of switching from an FRC mode to a bypass mode according to an embodiment.

FIG. 12 is a signal flowchart illustrating a procedure of switching from an FRC mode to a bypass mode according to an embodiment.

Referring to FIG. 12, in operation 1202, the FRC control condition determining unit 412 may receive the input video frame of timestamp 0 ms ('input VF, 0 ms') and BYPASS FALSE from the application 405. In an embodiment, upon receiving the first input video frame of video data, the FRC control condition determining unit 412 may operate in the FRC mode and, since the bypass control value is FALSE, the FRC mode may be maintained. In operation 1204, the FRC control condition determining unit 412 may transfer the input video frame ('input VF, 0 ms') to the FRC processing unit 420. In an embodiment, the input video frame ('input VF, 0 ms') may be transferred through the FRC control signal generating unit 414 to the FRC processing unit 420 or may be transferred to the FRC processing unit 420 without passing through the FRC control signal generating unit 414. In operation 1206, the FRC control condition determining unit 412 may receive the input video frame ('input VF, 33 ms') of timestamp 33 ms from the application 405 and, in operation 1208, transfer the input video frame ('input VF, 33 ms') to the FRC processing unit 420.

In operation 1210, the FRC control condition determining unit 412 may receive the input video frame of timestamp 66 ms ('input VF, 66 ms') and BYPASS TRUE from the application 405. In response to identifying that the bypass control value is TRUE, the FRC control condition determining unit 412 may identify a switch to the bypass mode. Until the switch to the bypass mode is completed, the input video frame ('input VF, 66 ms') may be transferred to the FRC processing unit 420 as in operation 1212. In operation 1212, the FRC control condition determining unit 412 may transfer the input video frame ('input VF, 66 ms') to the FRC processing unit 420.

In operation 1214, the FRC control condition determining unit 412 may receive the input video frame of timestamp 99 ms ('input VF, 99 ms') and BYPASS TRUE from the application 405. In operation 1216, the FRC control condition determining unit 412 may transfer the input video frame ('input VF, 99 ms') to the FRC processing unit 420. In an embodiment, as BYPASS TRUE is identified in operation 1210, at least one of operations 1212 and 1216 may be omitted.

In operation 1220, the FRC control condition determining unit 412 may receive, from the FRC processing unit 420, the interpolation frame ('IF (0,33)') generated using the interpolation frames (e.g., 'input VF, 0 ms' and 'input VF, 33 ms') set to BYPASS FALSE. In an embodiment, the interpolation frame ('IF (0,33)') may be transferred through the FRC control signal generating unit 414 to the FRC control condition determining unit 412 or be transferred to the FRC control condition determining unit 412 without passing through the FRC control signal generating unit 414. In operation 1222, the FRC control condition determining unit 412 may transmit the same video frame ('output VF, 0 ms') as 'input VF, 0 ms' to the application 405. In operation 1224, the FRC control condition determining unit 412 may transmit an output video frame ('output VF, 16 ms') including the interpolation frame ('IF (0,33)') to the application 405. In an embodiment, the output video frame may include the value (e.g., 16 ms) of the timestamp corresponding to the interpolation frame along with the interpolation frame ('IF (0,33)').

In operation 1226, the FRC control condition determining unit 412 may receive, from the FRC processing unit 420, the interpolation frame ('IF (33,66)') generated using 'input VF, 33 ms' and 'input VF, 66 ms'). In operation 1228, the FRC control condition determining unit 412 may transmit the same video frame ('output VF, 33 ms') as 'input VF, 33 ms' to the application 405. In operation 1230, the FRC control condition determining unit 412 may transmit an output video frame ('output VF, 49 ms') including the interpolation frame ('IF (33,66)') to the application 405. In an embodiment, the output video frame may include the value (e.g., 49 ms) of the timestamp corresponding to the interpolation frame along with the interpolation frame ('IF (33,66)').

In operation 1232, the FRC control condition determining unit 412 may receive, from the FRC processing unit 420, the interpolation frame ('IF (66,99)') generated using 'input VF, 66 ms' and 'input VF, 99 ms'). In operation 1234, the FRC control condition determining unit 412 may complete the switch to the bypass mode responsive to the bypass control value ('BYPASS TRUE') received along with 'input VF, 66 ms' in operation 1210. In an embodiment, at any time after operation 1210, the FRC control condition determining unit 412 may complete the switch to the bypass mode and proceed to operation 1236. In an embodiment, the FRC control condition determining unit 412 may discard or disregard 'IF (66,99)' for the input video frames ('input VF, 66 ms' and 'input VF, 99 ms') set to BYPASS TRUE.

In operation 1236 after being set to the bypass mode, the FRC control condition determining unit 412 may transmit a stop signal to the FRC control signal generating unit 414. In operation 1238, the FRC control signal generating unit 414 may transmit a stop signal to the FRC processing unit 420. In response to reception of the stop signal, the FRC processing unit 420 may not perform FRC processing, saving power consumption.

In operation 1240, the FRC control condition determining unit 412 may transmit the same video frame ('output VF, 66 ms') as 'input VF, 66 ms' to the application 405. Although not shown, in an embodiment, upon receiving 'IF (66,99)' from the FRC processing unit 420 before completing the switch to the bypass mode, the FRC control condition determining unit 412 may transmit, to the application 405, the output video frame (e.g., 'output VF, 82 ms') including 'IF (66,99)' after transmitting 'output VF, 66 ms'. In operation 1242, the FRC control condition determining unit 412 may transmit the same video frame ('output VF, 99 ms') as 'input VF, 99 ms' to the application 405.

After being set to the bypass mode, the FRC control condition determining unit 412 may not transfer the interpolation frame(s) (e.g., 'IF (66,99)') received from the FRC processing unit 420. After being set to the bypass mode, the FRC control condition determining unit 412 may not transfer the input video frames received from the application 405 to the FRC processing unit 420.

Figure 13:
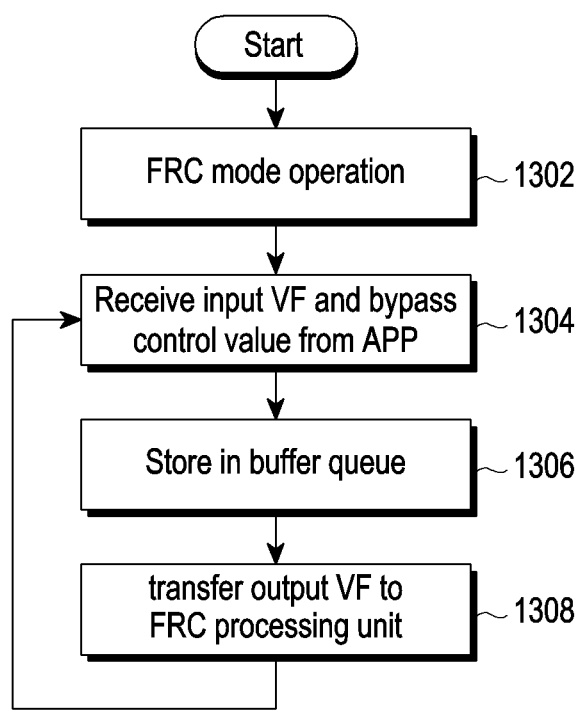
FIG. 13 is a flowchart illustrating input processing in an FRC mode according to an embodiment.

FIG. 13 is a flowchart illustrating input processing in an FRC mode according to an embodiment. At least one of the operations described below may be executed by the processor 120 (e.g., the FRC control condition determining unit 412) of the electronic device 101. In the FRC mode, the input video frames and the output video frames may be processed asynchronously.

Referring to FIG. 13, in operation 1302, the processor 120 (e.g., the FRC control condition determining unit 412) may be operating in the FRC mode in response to the bypass control value set to FALSE, received from the application 405. In operation 1304, the processor 120 (e.g., the FRC control condition determining unit 412) may receive the input video frame and the bypass control value, set to FALSE, from the application 405, in a state in which the FRC mode is set. In operation 1306, the processor 120 (e.g., the FRC control condition determining unit 412) may store the input video frame in the buffer queue. In operation 1308, the processor 120 (e.g., the FRC control condition determining unit 412) may transfer the input video frame stored in the buffer queue to the FRC processing unit 420. Operations 1304, 1306, and 1308 may be repeated while the FRC mode is maintained.

Figure 14:
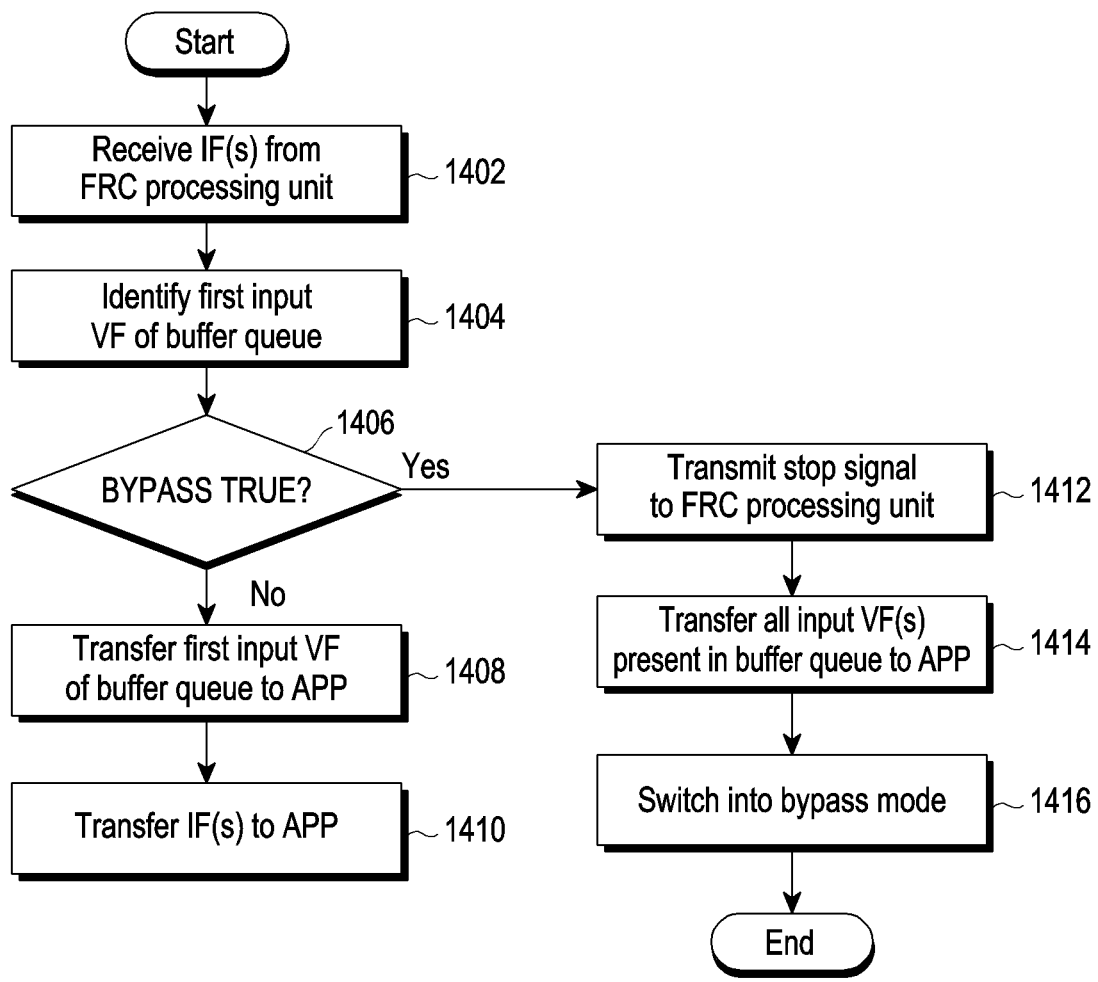
FIG. 14 is a flowchart illustrating output processing in an FRC mode according to an embodiment.

FIG. 14 is a flowchart illustrating output processing in an FRC mode according to an embodiment. At least one of the operations described below may be executed by the processor 120 (e.g., the FRC control condition determining unit 412) of the electronic device 101.

Referring to FIG. 14, in operation 1402, the processor 120 (e.g., the FRC control condition determining unit 412) may receive an interpolation frame(s) from the FRC processing unit 420. In an embodiment, the interpolation frame(s), together with the input video frames, may be stored in the buffer queue of the FRC controller 410 or a separate storage area or memory. In operation 1404, the processor 120 (e.g., the FRC control condition determining unit 412) may identify the bypass control value of the first input video frame (e.g., one having the earliest timestamp) stored in the buffer queue. In operation 1406, the processor 120 (e.g., the FRC control condition determining unit 412) may identify whether the bypass control value is TRUE and, if TRUE, proceed to operation 1412 and, otherwise (e.g., if FALSE), proceed to operation 1408.

In operation 1408, the processor 120 (e.g., the FRC control condition determining unit 412) may include the first input video frame in the output video frame and transmit it to the application 405. In operation 1410, the processor 120 (e.g., the FRC control condition determining unit 412) may include the interpolation frame received in operation 1402 in the output video frame and transmit it to the application 405. In operations 1408 and 1410, the input video frame and the interpolation frame may be transferred to the application 405 in order of timestamp.

In operation 1412, the processor 120 (e.g., the FRC control condition determining unit 412) may transmit a stop signal to the FRC processing unit 420 through the FRC control signal generating unit 414 to stop the FRC processing unit 420 and, in operation 1414, include all input video frames present in the buffer queue in the output video frames and sequentially transfer them to the application 405. In operation 1416, the processor 120 (e.g., the FRC control condition determining unit 412) may switch the FRC controller 410 to the bypass mode. In an embodiment, the FRC control signal generating unit 414 may change the FRC processing unit 420 to the stopped state.

Figure 15:
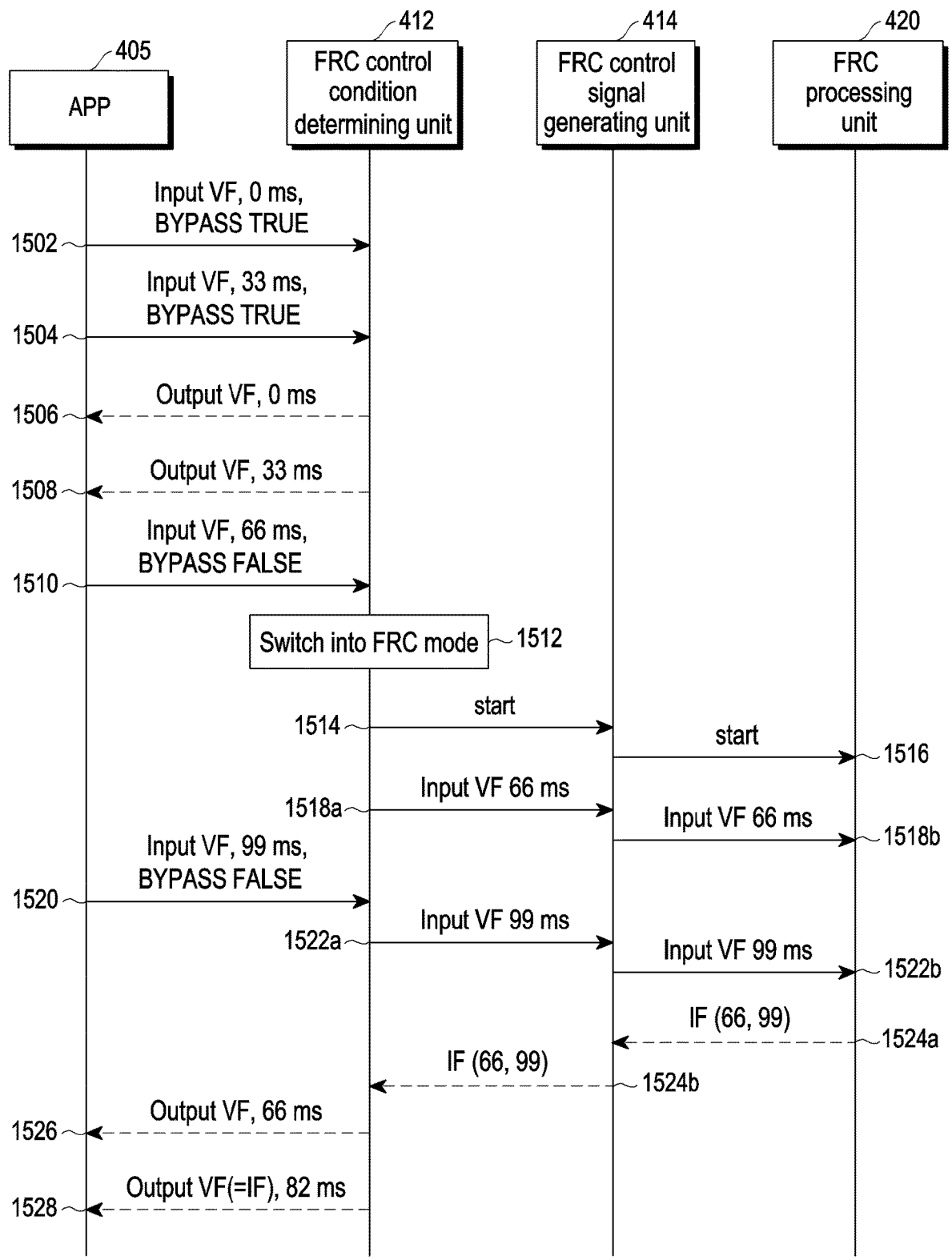
FIG. 15 is a signal flowchart illustrating a procedure of switching from a bypass mode to an FRC mode according to an embodiment.

FIG. 15 is a signal flowchart illustrating a procedure of switching from a bypass mode to an FRC mode according to an embodiment.

Referring to FIG. 15, in operation 1502, the FRC control condition determining unit 412 may receive the input video frame of timestamp 0 ms ('input VF, 0 ms') and BYPASS TRUE from the application 405 in the bypass mode. Since the FRC controller 410 is set to the bypass mode, the input video frame ('input VF, 0 ms') may not be transferred to the FRC processing unit 420. In operation 1504, the FRC control condition determining unit 412 may receive the input video frame ('input VF, 33 ms') of timestamp 33 ms from the application 405, and the input video frame ('input VF, 33 ms') may not likewise be transferred to the FRC processing unit 420.

In operation 1506, the FRC control condition determining unit 412 may transmit the same video frame ('output VF, 0 ms') as 'input VF, 0 ms' to the application 405. In operation 1508, the FRC control condition determining unit 412 may transmit the same video frame ('output VF, 33 ms') as 'input VF, 33 ms' to the application 405. In the bypass mode, the output video frames may be transferred to the application 405 without interpolation frames.

In operation 1510, the FRC control condition determining unit 412 may receive the input video frame of timestamp 66 ms ('input VF, 66 ms') and BYPASS FALSE from the application 405. In operation 1512, the FRC control condition determining unit 412 may switch to the FRC mode in response to identifying that the bypass control value is FALSE.

In operation 1514 after switching to the FRC mode, the FRC control condition determining unit 412 may transmit a start signal to the FRC control signal generating unit 414. In operation 1516, the FRC control signal generating unit 414 may transmit a start signal to the FRC processing unit 420. The FRC processing unit 420 may prepare for (e.g., allocation/reallocation and initialization of FRC resource) FRC processing in response to reception of the start signal.

In operation 1518a, the FRC control condition determining unit 412 may transfer the input video frame ('input VF, 66 ms') having BYPASS FALSE to the FRC control signal generating unit 414 and, in operation 1518b, the FRC control signal generating unit 414 may transmit 'input VF, 66 ms' to the FRC processing unit 420. In operation 1520, the FRC control condition determining unit 412 may receive the input video frame ('input VF, 99 ms') having BYPASS FALSE from the application 405. In operations 1522a and 1522b, the FRC control condition determining unit 412 may transmit 'input VF, 99 ms' to the FRC processing unit 420 through the FRC control signal generating unit 414.

In operations 1524a and 1524b, the FRC control condition determining unit 412 may receive the interpolation frame ('IF (66,99)') generated using 'input VF, 66 ms' and 'input VF, 99 ms' from the FRC processing unit 420 through the FRC control signal generating unit 414. In operation 1526, the FRC control condition determining unit 412 may transmit the output video frame ('output VF, 66 ms') including 'input VF, 66 ms' to the application 405. In operation 1528, the FRC control condition determining unit 412 may transmit the output video frame ('output VF, 82 ms') including the 'IF, (66,99)' to the application 405.

In an embodiment, the application 405 may set the FRC processing to the bypass forced mode. In the bypass forced mode, the FRC control condition determining unit 412 may change the bypass control value received along with the input video frame to TRUE and then process the input video frame according to the bypass mode. In an embodiment, the application 405 may set the bypass forced mode in circumstances where a higher response speed than performing FRC processing on the input video frames is critical. As an example, when the application 405 is a media player, the bypass forced mode may be set.

Figure 16:
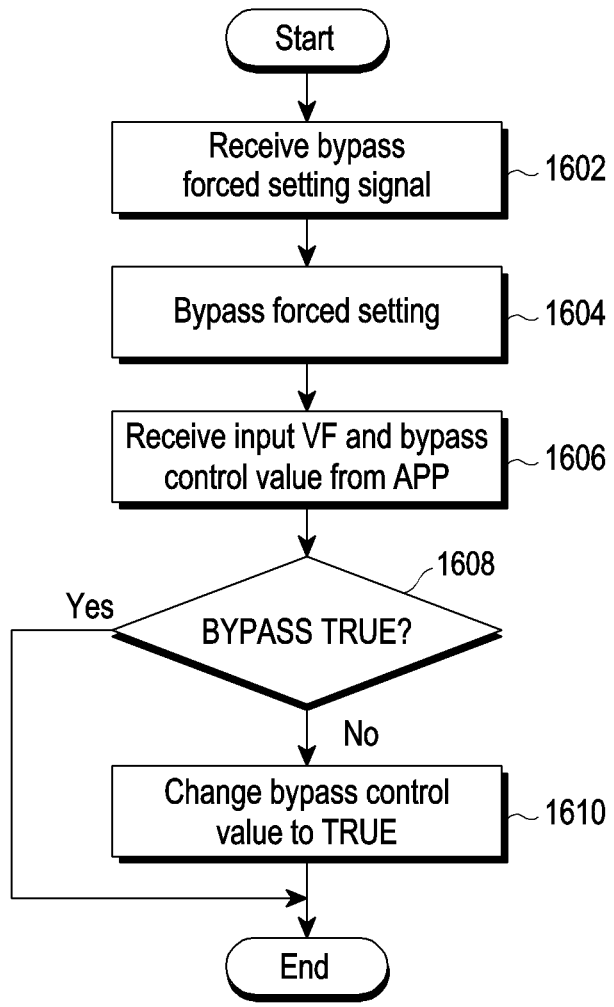
FIG. 16 is a flowchart illustrating a setting of a bypass forced mode according to an embodiment.

FIG. 16 is a flowchart illustrating a setting of a bypass forced mode according to an embodiment. At least one of the operations described below may be executed by the processor 120 (e.g., the FRC control condition determining unit 412) of the electronic device 101.

Referring to FIG. 16, in operation 1602, the processor 120 (e.g., the FRC control condition determining unit 412) may receive a bypass forced setting signal from the application 405. In an embodiment, the bypass forced setting signal may be generated when or while the application 405 is executed according to the determination by the application 405.

In operation 1604, the processor 120 (e.g., the FRC control condition determining unit 412) may set the bypass forced mode in response to the bypass forced setting signal. In operation 1606, the processor 120 (e.g., the FRC control condition determining unit 412) may receive the input video frame and the bypass control value from the application 405. In operation 1608, the processor 120 (e.g., the FRC control condition determining unit 412) may identify whether the bypass control value is set to TRUE. If the bypass control value is not set to TRUE, the processor 120 (e.g., the FRC control condition determining unit 412) may proceed to operation 1610 and may otherwise (e.g., if set to TRUE) terminate the operations.

In operation 1610, the processor 120 (e.g., the FRC control condition determining unit 412) may change the bypass control value to TRUE based on the bypass forced mode being set. Thereafter, the processor 120 (e.g., the FRC control condition determining unit 412) may process the input video frame in the bypass mode according to the bypass control value changed to TRUE.

In an embodiment, the bypass forced mode may be set upon determining that use of FRC processing is not effective relative to costs. In an embodiment, the processor 120 (e.g., the application 405) may determine to set the bypass forced mode in at least one of the following contexts.

a state in which the FRC processing unit 420 is not ready (e.g., before the FRC controller 410 changes the FRC processing unit 420 to the initialized state 704);

when the size of the screen displayed on the display module (e.g., the display module 160) is smaller than a designated first threshold;

when the interframe variance of the video frames is less than a designated second threshold; and/or when the field of view of extended reality (XR) glasses (e.g., augmented reality (AR) glasses, virtual reality (VR) glasses, mixed reality (MR) glasses, or substitutional reality (SR) glasses) is out of the camera's field of view.

In one embodiment, the bypass forced mode may be set based on a determination that the video playback device (e.g., the electronic device 101) is operating in a low power, or limited power consumption mode. For example, if the video playback device is a battery powered electronic device such as a laptop, tablet or smartphone that is operating in a limited power consumption mode, the bypass forced mode may be used.

Figure 17:
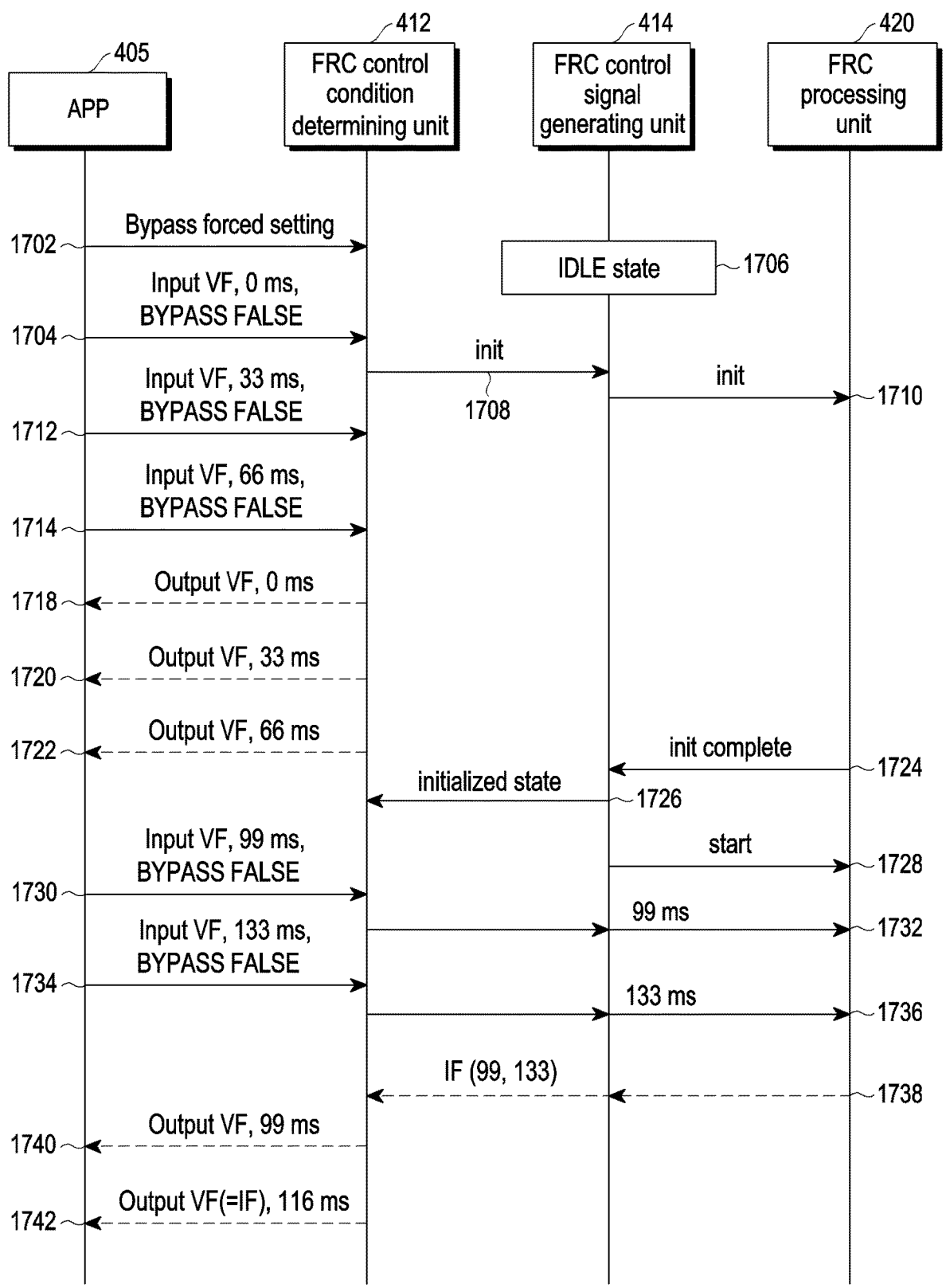
FIG. 17 is a signal flowchart illustrating an operation of executing a bypass forced mode while an FRC processing unit is initialized according to an embodiment.

FIG. 17 is a signal flowchart illustrating an operation of executing a bypass forced mode while an FRC processing unit 420 is initialized according to an embodiment.

Referring to FIG. 17, in operation 1702, the FRC control condition determining unit 412 may receive a bypass forced setting signal to request to set the bypass forced mode from the application 405. The FRC control condition determining unit 412 may set the bypass forced mode in response to reception of the bypass forced setting signal. In an embodiment, in operation 1708, the FRC control condition determining unit 412 may set the bypass forced mode before transmitting the initialize signal to the FRC control signal generating unit 414.

In operation 1704, the FRC control condition determining unit 412 may receive the input video frame of timestamp 0 ms ('input VF, 0 ms') and BYPASS FALSE from the application 405. In an embodiment, in operation 1706, the FRC control signal generating unit 414 may manage the FRC processing unit 420 in the idle state (e.g., the idle state 702). The FRC control condition determining unit 412 may recognize reception of BYPASS FALSE to request FRC processing while the bypass forced mode is set and the FRC processing unit 420 is in the idle state (i.e., a state in which the FRC processing unit 420 is not ready). In operation 1708, the FRC control condition determining unit 412 may transmit an initialize (init) signal to the FRC control signal generating unit 414 and, in operation 1710, the FRC control signal generating unit 414 may transfer the initialize signal to the FRC processing unit 420. Since the FRC processing unit 420 may take a predetermined time to get ready, and the bypass forced mode is set, the FRC control condition determining unit 412 may operate in the bypass mode to force bypass until before the FRC processing unit 420 gets ready.

In operations 1712 and 1714, the FRC control condition determining unit 412 may receive input video frames ('input VF, 33 ms' and 'input VF, 66 ms') having BYPASS FALSE.

In operation 1716, the FRC control condition determining unit 412 may change the bypass control value of 'input VF, 33 ms' and 'input VF, 66 ms' to TRUE according to the bypass mode. In operations 1718, 1720, and 1722, the FRC control condition determining unit 412 may sequentially transmit, to the application 405, the same output video frames ('output VF, 0 ms', 'output VF, 33 ms', and 'output VF, 66 ms') as 'input VF, 0 ms', 'input VF, 33 ms' and 'input VF, 66 ms'. In an embodiment, since the FRC control signal generating unit 414 is initializing the FRC processing unit 420, and the FRC processing unit is not ready, the FRC control condition determining unit 412 may not request (e.g., transmit a start signal) the FRC control signal generating unit 414 to change the state.

In operation 1724, the FRC processing unit 420 may complete the preparation for FRC processing and transmit an initialize (init) complete signal to the FRC control signal generating unit 414. In operation 1726, the FRC control signal generating unit 414 may set the FRC processing unit 420 to the initialized state (e.g., the initialized state 704) in response to reception of the initialization complete signal and notify the FRC control condition determining unit 412 of the state change of the FRC processing unit 420 (e.g., setting of the initialized state 704). In operation 1728, the FRC control signal generating unit 414 may transmit a start signal to the FRC processing unit 420, instructing it to perform FRC processing. In an embodiment, the FRC control signal generating unit 414 may transmit the start signal to the FRC processing unit 420 in response to reception of the start signal from the FRC control condition determining unit 412 after notifying the FRC control condition determining unit 412 of the state change. The FRC control signal generating unit 414 may set the FRC processing unit 420 to the started state (e.g., the started state 706) after transmitting the start signal. In an embodiment, the FRC control condition determining unit 412 may release the bypass mode for forcing bypass, after transmitting the start signal to the FRC control signal generating unit 414. In an embodiment, the FRC control condition determining unit 412 may receive a signal indicating that the FRC processing unit 420 is ready (e.g., a signal indicating that the FRC processing unit 420 is in the started state) from the FRC control signal generating unit 414 and release the bypass forced mode.

After releasing the bypass mode to force bypass, in operation 1730, the FRC control condition determining unit 412 may receive 'input VF, 99 ms' and BYPASS FALSE from the application and, in operation 1732, transfer 'input VF, 99 ms' to the FRC processing unit 420. In operation 1734, the FRC control condition determining unit 412 may receive 'input VF, 133 ms' and BYPASS FALSE from the application 405 and, in operation 1736, transfer 'input VF, 133 ms' to the FRC processing unit 420.

In operation 1738, the FRC control condition determining unit 412 may receive 'input VF, 133 ms' and the interpolation frame ('IF (99,133)') generated using 'input VF, 133 ms' from the FRC processing unit 420. In operation 1740, the FRC control condition determining unit 412 may transmit 'output VF, 99 ms' including 'input VF, 99 ms' to the application 405. In operation 1742, the FRC control condition determining unit 412 may transmit 'output VF, 116 ms' including 'IF (99,133)' to the application 405. Although not shown, after 'output VF, 116 ms' is transmitted, the FRC control condition determining unit 412 may transmit 'output VF, 133 ms' including 'input VF, 133 ms' to the application 405.

Figure 18:
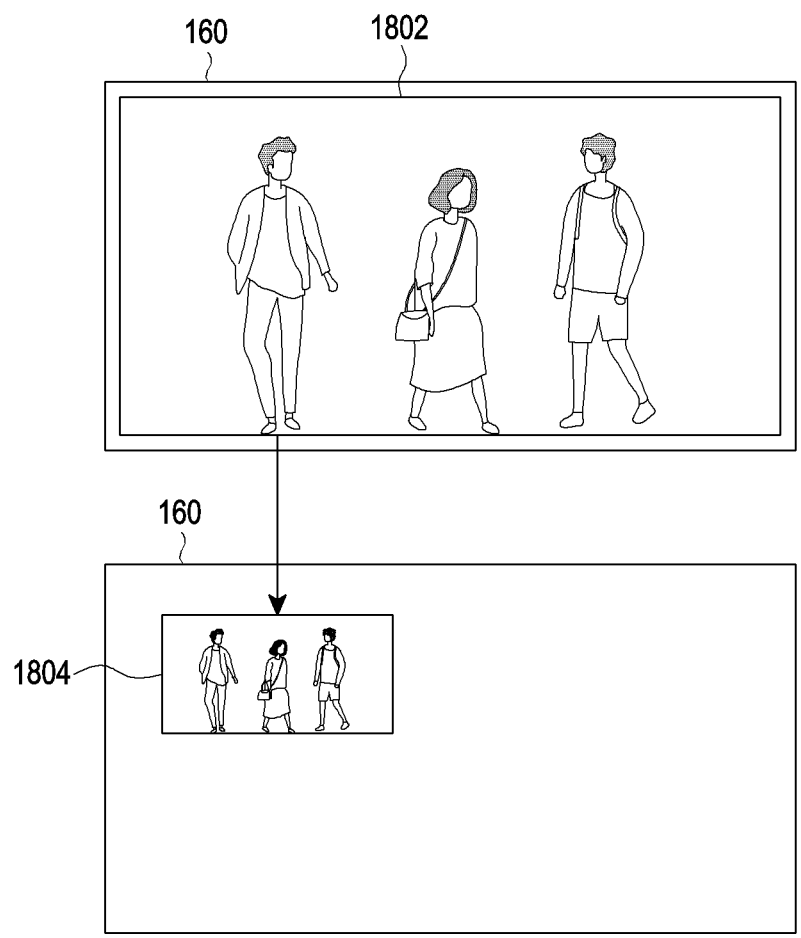
FIG. 18 is a schematic view illustrating a case in which a screen where video is displayed is shrunken according to an embodiment.

FIG. 18 is schematic a view illustrating a case in which a screen where the video is displayed is shrunken according to an embodiment.

Referring to FIG. 18, the display module 160 may play back video in a first screen area 1802 under the control of the processor 120. In response to a predetermined event, such as a call reception, or in response to a user gesture, the processor 120 may determine to shrink the first screen area 1802. In an embodiment, the processor 120 may continue to play back the video in a second screen area 1804 smaller than the first screen area 1802 on the display module 160. In the second screen area 1804, the processor 120 may determine the bypass mode to force bypass to bypass FRC processing.

Figure 19:
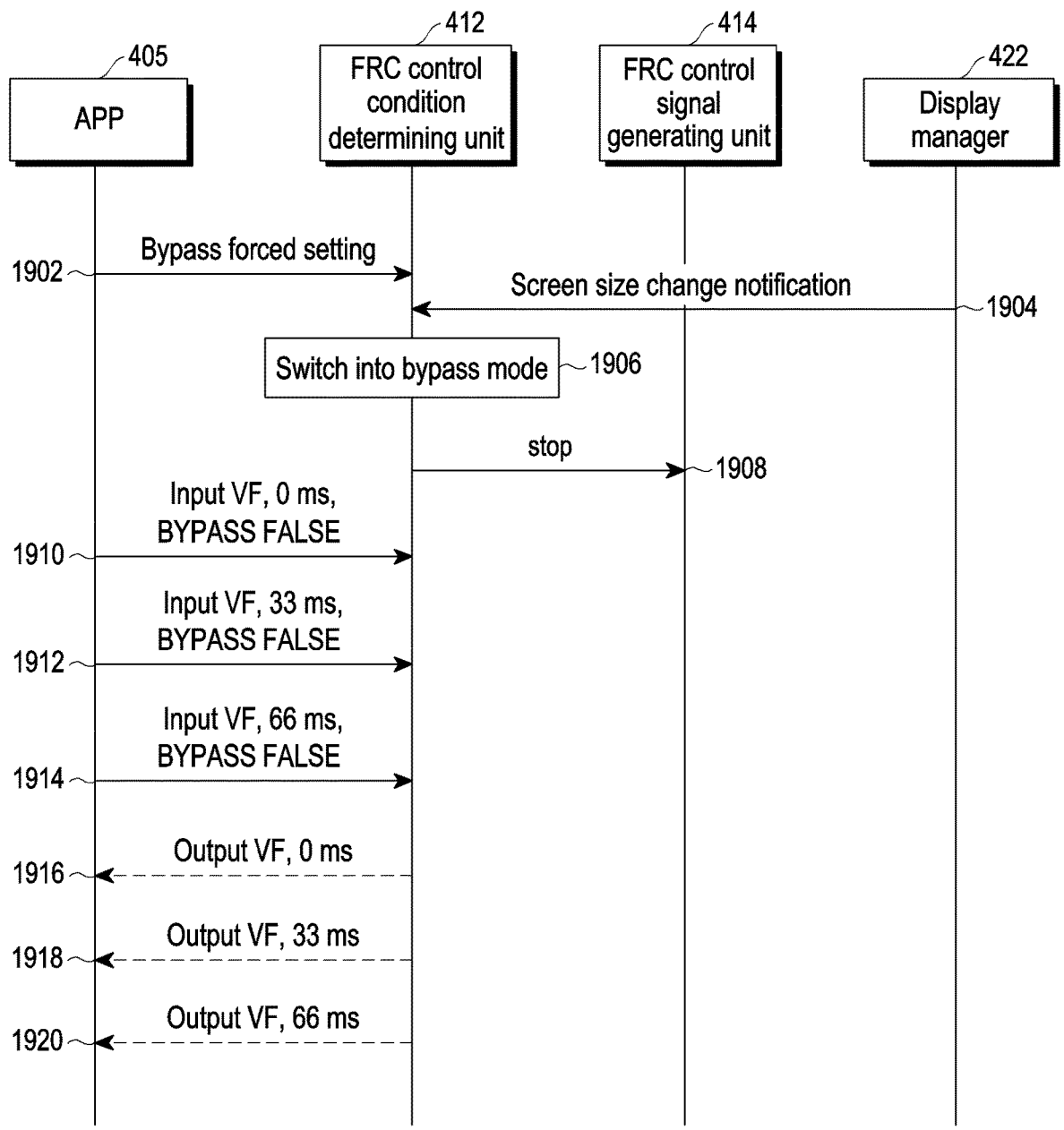
FIG. 19 is a signal flowchart illustrating an operation of executing a bypass forced mode as screen is shrunken according to an embodiment.

FIG. 19 is a signal flowchart illustrating an operation of executing a bypass forced mode as screen is shrunken according to an embodiment.

Referring to FIG. 19, in operation 1902, the application 405 may transmit a bypass forced setting signal to request to set the bypass forced mode to the FRC control condition determining unit 412. In an embodiment, the FRC control condition determining unit 412 may set the bypass forced mode in response to reception of the bypass forced setting signal and determine whether to switch to the bypass mode according to a designated condition (e.g., size of screen area, image variance, or field of view of XR glasses) in the case where the bypass forced mode is set. In an embodiment, operation 1902 may be omitted. The FRC control condition determining unit 412 may determine whether to switch to the bypass mode according to the designated condition without a bypass forced setting signal from the application 405.

In operation 1904, the FRC control condition determining unit 412 may receive a notification signal indicating a change in the screen size from the display manager 422. In an embodiment, the notification signal may be generated by the display manager 422 in a case where the size of the screen area in which the video data executed by the application 405 is played back on the display module 160 is changed. In an embodiment, the notification signal may include information about the size of the screen area. In an embodiment, the notification signal may be generated by the display manager 422 in a case where the size of the screen area in which the video data executed by the application 405 is played back on the display module 160 is less than a first threshold.

In operation 1906, the FRC control condition determining unit 412 may switch to the bypass mode to force bypass in response to reception of the notification signal. In an embodiment, the notification signal may include information about the size of the screen area. The FRC control condition determining unit 412 may determine to switch to the bypass mode by identifying that the size of the screen area is less than the first threshold. In an embodiment, the FRC control condition determining unit 412 may switch to the bypass mode in response to identifying that the bypass forced setting signal is received from the application 405, and the size of the screen area is less than the first threshold. In operation 1908 after switching to the bypass mode, the FRC control condition determining unit 412 may transmit a stop signal to the FRC control signal generating unit 414. In an embodiment, the FRC control signal generating unit 414 may transmit a stop signal to the FRC processing unit 420.

In operations 1910, 1912, and 1914, the FRC control condition determining unit 412 may sequentially receive 'input VF, 0 ms', 'input VF, 33 ms', and 'input VF, 66 ms' along with BYPASS FALSE from the application 405. Since the bypass mode is set, the input video frames may not be transferred to the FRC processing unit 420.

In operations 1916, 1918, and 1920, the FRC control condition determining unit 412 may transmit, to the application 405, 'output VF, 0 ms', 'output VF, 33 ms' and 'output VF, 66 ms' respectively including 'input VF, 0 ms', 'input VF, 33 ms' and 'input VF, 66 ms' and interpolation frames for the input video frames may not be generated.

In an embodiment, the FRC control condition determining unit 412 may proceed to operation 1906 to switch to the bypass mode in response to detecting that the display output frequency is designated to be less than a designated threshold by the user's setting. In an embodiment, when the display output frequency is set to 60 Hz, and the output frame rate predicted through FRC processing is 120 FPS, the FRC control condition determining unit 412 may determine to switch to the bypass mode. In an embodiment, the FRC control condition determining unit 412 may receive information about display output from the application 405 or the display manager 422.

In an embodiment, the FRC control condition determining unit 412 may proceed to operation 1906 to switch to the bypass mode in response to detecting that the image variance of the video frames is smaller than a second threshold. In an embodiment, the image variance may be the average of the numerical values of image differences between successive video frames during a designated time period. In an embodiment, the FRC control condition determining unit 412 may measure the image variance of the video frames received from the application 405 and determine whether the image variance is smaller than the second threshold. In an embodiment, the FRC control condition determining unit 412 may receive information about the image variance of the video frames from the FRC processing unit 420 while FRC processing is performed by the FRC processing unit 420. In an embodiment, the FRC control condition determining unit 412 may receive information about the image variance of the video frames from the application 405.

In an embodiment, the FRC control condition determining unit 412 may proceed to operation 1906 to switch to the bypass mode in response to detecting that the field of view of the XR glasses connected with the electronic device 101 falls outside the field of view of the camera (e.g., the camera module 180). In an embodiment, the FRC control condition determining unit 412 may receive a signal indicating that the field of view of the XR glasses falls outside the field of view of the camera from the application 405. The FRC control condition determining unit 412 may receive the signal indicating that the field of view of the XR glasses falls outside the field of view of the camera from the XR glasses or camera module 180.

Figure 20:
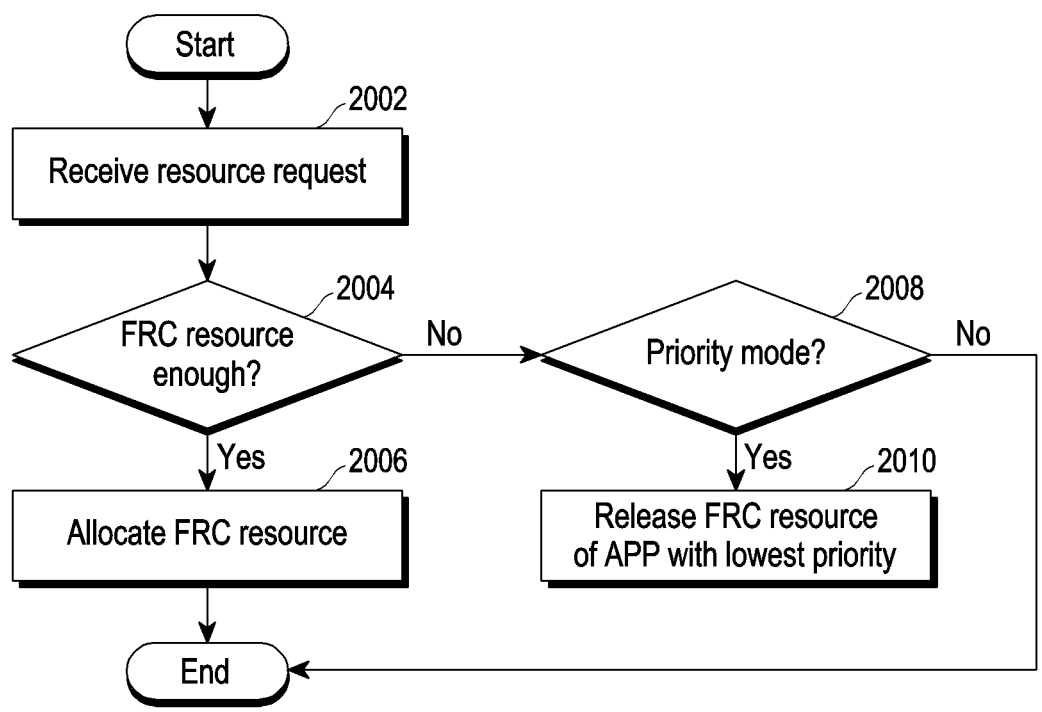
FIG. 20 is a schematic view illustrating allocation and recovery of an FRC resource according to an embodiment.

FIG. 20 is a schematic view illustrating the allocation and recovery of an FRC resource according to an embodiment. At least one of the operations described below may be executed by the processor 120 (e.g., the resource management condition determining unit 416) of the electronic device 101.

Referring to FIG. 20, in operation 2002, the processor 120 (e.g., the resource management condition determining unit 416) may receive a resource request signal to request allocation of a process resource (i.e., FRC resource) for FRC processing of a specific application (e.g., the application 405). As an example, the resource request signal may be generated by the FRC processing unit 420 or the FRC control signal generating unit 414 corresponding to the application 405. In operation 2004, the processor 120 (e.g., the resource management condition determining unit 416) may determine whether the FRC resource is sufficient. In an embodiment, the processor 120 (e.g., the resource management condition determining unit 416) may determine whether the FRC processing unit 420 has a resource for performing FRC processing for the application 405. If the FRC resource is sufficient, the processor 120 (e.g., the resource management condition determining unit 416) may proceed to operation 2006. In contrast, if the FRC resource is not sufficient, the processor 120 (e.g., the resource management condition determining unit 416) may proceed to operation 2008.

In operation 2006, the processor 120 (e.g., the resource management condition determining unit 416) may allocate an FRC resource for the application 405.

In operation 2008, the processor 120 (e.g., the resource management condition determining unit 416) may determine whether the allocation of the FRC resource is performed in the priority mode. In an embodiment, the processor 120 (e.g., the resource management condition determining unit 416) may determine whether to perform the FRC resource allocation in the priority mode according to a designated policy. If set to perform FRC resource allocation in the priority mode, the processor 120 (e.g., the resource management condition determining unit 416) may proceed to operation 2010. In contrast, if FRC resource allocation in the priority mode is not set, the processor 120 (e.g., the resource management condition determining unit 416) may determine that FRC resource allocation for the application 405 fails and terminate the operations.

In operation 2010, the processor 120 (e.g., the resource management condition determining unit 416) may identify priorities of one or more applications allocated FRC resources (e.g., using the FRC processing unit 420), release the FRC resource of the application with the lowest priority, and allocate the released FRC resource to the application 405 corresponding to the resource request signal.

Figure 21:
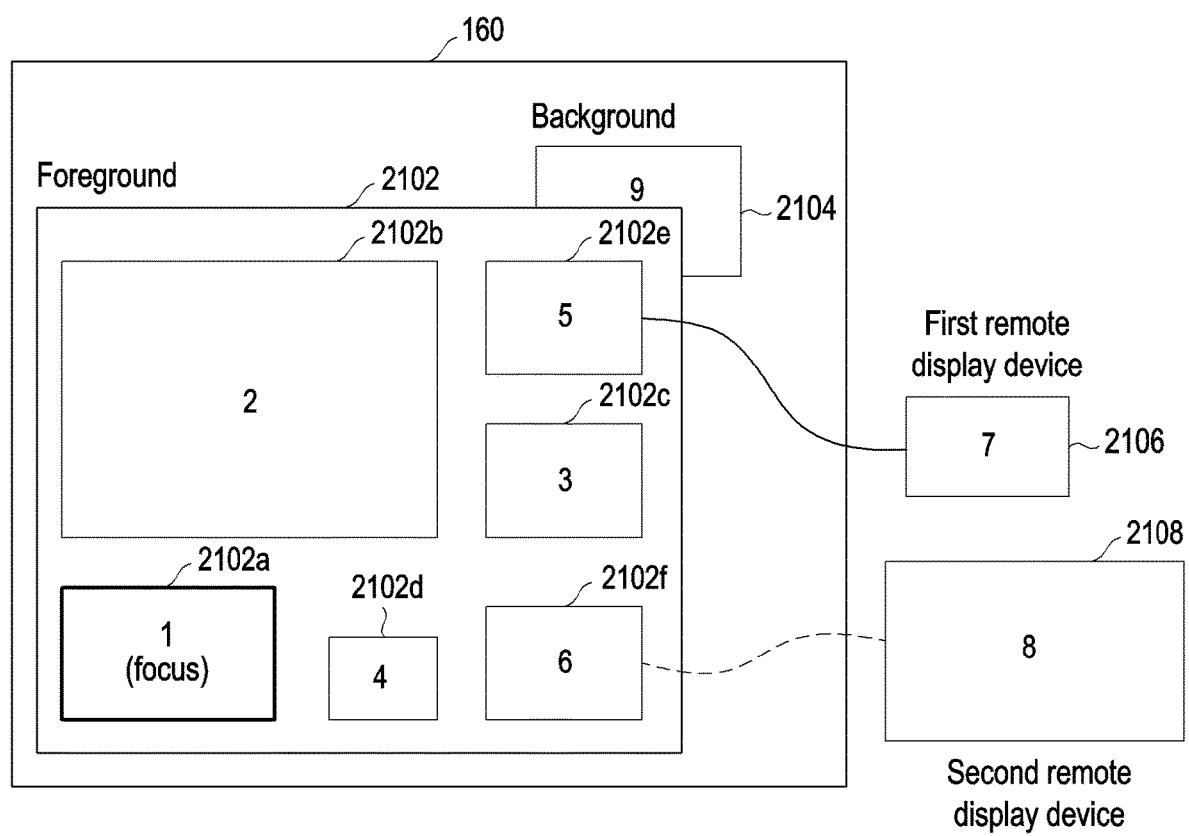
FIG. 21 is a schematic view illustrating a priority policy of FRC resource allocation according to an embodiment.

FIG. 21 is a schematic view illustrating a priority policy of FRC resource allocation according to an embodiment.

Referring to FIG. 21, the display module 160 may include a plurality of screen areas 2102a, 2102b, 2102c, 2102d, 2102e, 2102f, and 2104 executed by different applications, and at least some of the screen areas 2102a, 2102b, 2102c, 2102d, 2102e, 2102f, and 2104 may have different priorities.

In an embodiment, the foreground screen area 2102 may display video executed by one or more foreground applications. The background screen area 2104 may display the video executed by the background application. The foreground application(s) corresponding to the foreground screen area 2102 may have a higher priority than the background application corresponding to the background screen area 2104.

In an embodiment, the application(s) displayed on the main display device (e.g., the display module 160) may have a higher priority than the applications displayed on other display devices (e.g., a first remote display device 2106 and a second remote display device 2108).

In an embodiment, the application displayed in the screen area (e.g., the screen area 2102b) having a relatively large size of the foreground screen area 2102 may have a higher priority than the applications displayed in other screen areas 2102a, 2102c, 2102d, 2102e, and 2102f.

In an embodiment, the application displayed in the focused screen area 2102a of the foreground screen area 2102 may have a higher priority than the applications displayed in the other screen areas 2102b, 2102c, 2102d, 2102e, and 2102f.

In an embodiment, the remote display device (e.g., the first remote display device 2106) wiredly connected may have a higher priority than the remote display device (e.g., the second remote display device 2108) wirelessly connected.

Figure 22:
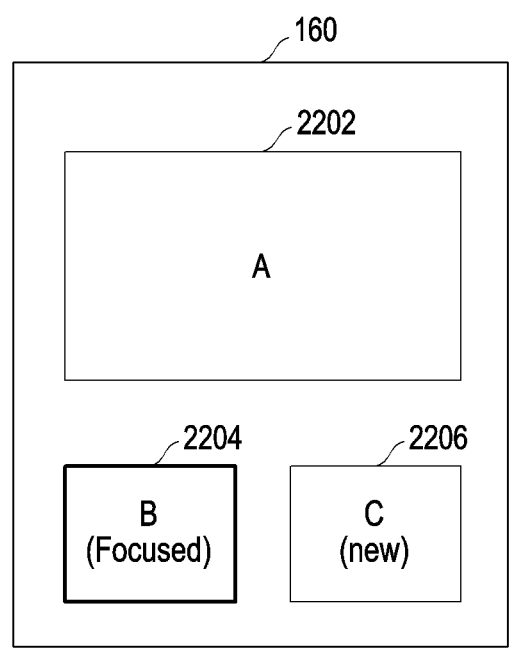
FIG. 22 is a schematic view illustrating multi-display according to an embodiment.

FIG. 22 is a schematic view illustrating multi-display according to an embodiment.

Referring to FIG. 22, the display module 160 of the electronic device 101 may display a plurality of screen areas 2202, 2204, and 2206 respectively corresponding to the plurality of applications (e.g., applications A, B, and C). Application A may be displayed in screen area A 2202, application B may be displayed in screen area B 2204, and application C may be displayed in screen area C 2206.

In an embodiment, application A and application B are using the FRC processing unit 420, and application C may request FRC resource allocation to newly use the FRC processing unit 420. In an embodiment, application B may be displayed in the focused screen area B 2204 and may have a higher priority than application A.

Figure 23:
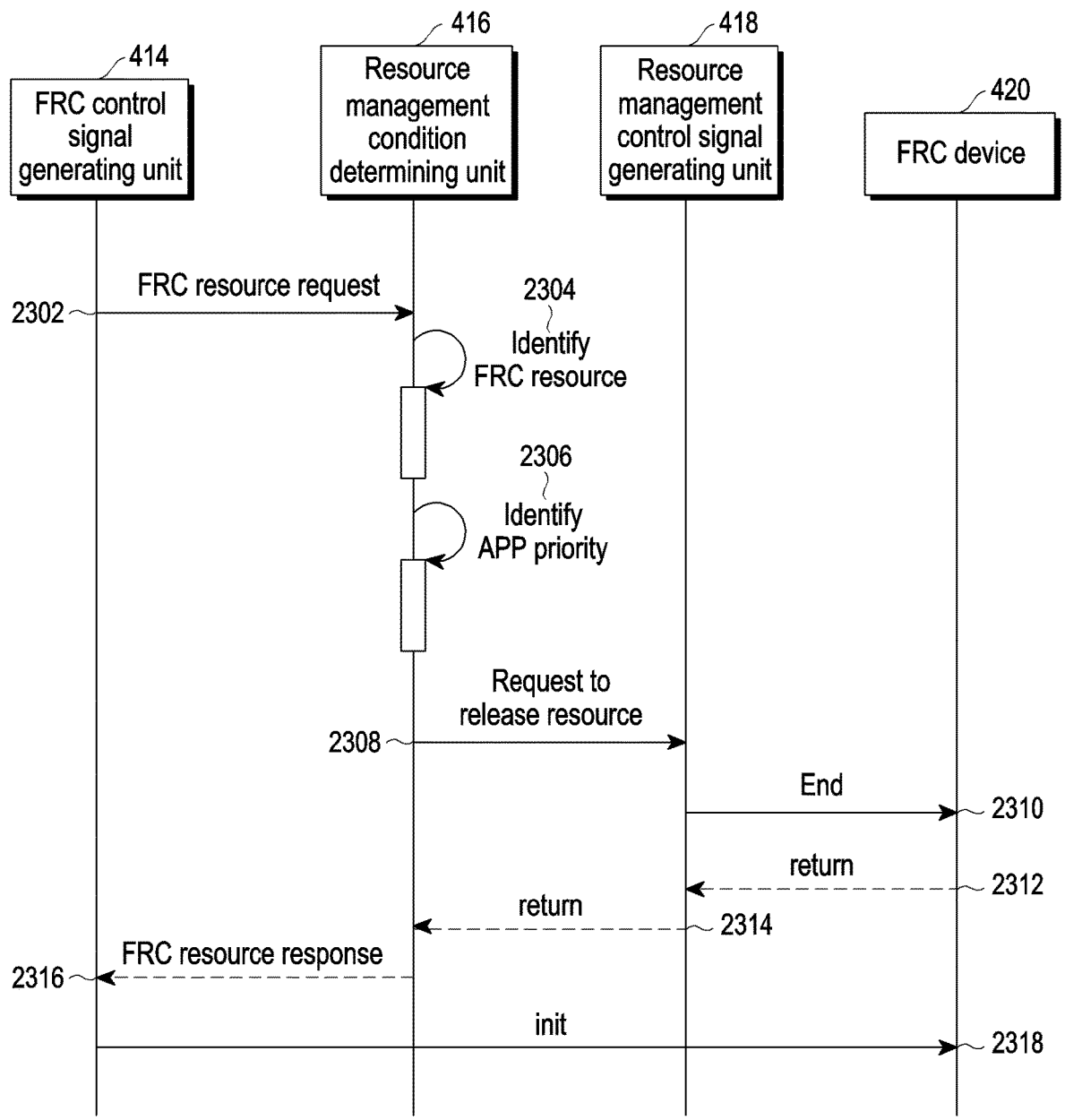
FIG. 23 is a signal flowchart illustrating FRC resource allocation using a priority mode according to an embodiment.

FIG. 23 is a signal flowchart illustrating FRC resource allocation using a priority mode according to an embodiment.

Referring to FIG. 23, in operation 2302, the FRC control signal generating unit 414 corresponding to application C may transmit a resource request signal for requesting allocation of an FRC resource to the resource management condition determining unit 416. In an embodiment, the FRC control signal generating unit 414 may generate the resource request signal for the FRC resource to use application C in response to execution of a new application (e.g., application C corresponding to screen area C 2206). In an embodiment, the FRC control signal generating unit 414 may generate the resource request signal in response to reception of an initialize signal for FRC processing of application C from the FRC control condition determining unit 412.

In operation 2304, the resource management condition determining unit 416 may identify the absence (or insufficient) of an extra FRC resource for performing FRC processing for application C as a result of determining whether there is an extra FRC resource allocable to application C. In operation 2306, the resource management condition determining unit 416 may identify the priorities of the applications (e.g., application A and application B) using the FRC resource. In an embodiment, the resource management condition determining unit 416 may identify that, among the applications allocated FRC resources, application A has the lowest priority.

In operation 2308, the resource management condition determining unit may transmit a resource release request signal for requesting to release the FRC resource allocated to application A to the resource management control signal generating unit 418. In operation 2310, the resource management control signal generating unit 418 may transmit an end signal for requesting to release the FRC resource allocated to application A to the FRC processing unit 420. In operation 2312, the FRC processing unit 420 may transmit a return signal to indicate that the FRC resource allocated to application A is released to the resource management control signal generating unit 418. In operation 2314, the resource management control signal generating unit 418 may transfer the return signal to the resource management condition determining unit 416 to allocate the released resource to application C.

In operation 2316, the resource management condition determining unit 416 may transmit an FRC resource response signal indicating that the FRC resource for application C is available to the FRC control signal generating unit 414. In operation 2318, the FRC control signal generating unit 414 may transmit an initialize signal for starting FRC processing for application C to the FRC processing unit 420.

Figure 24:
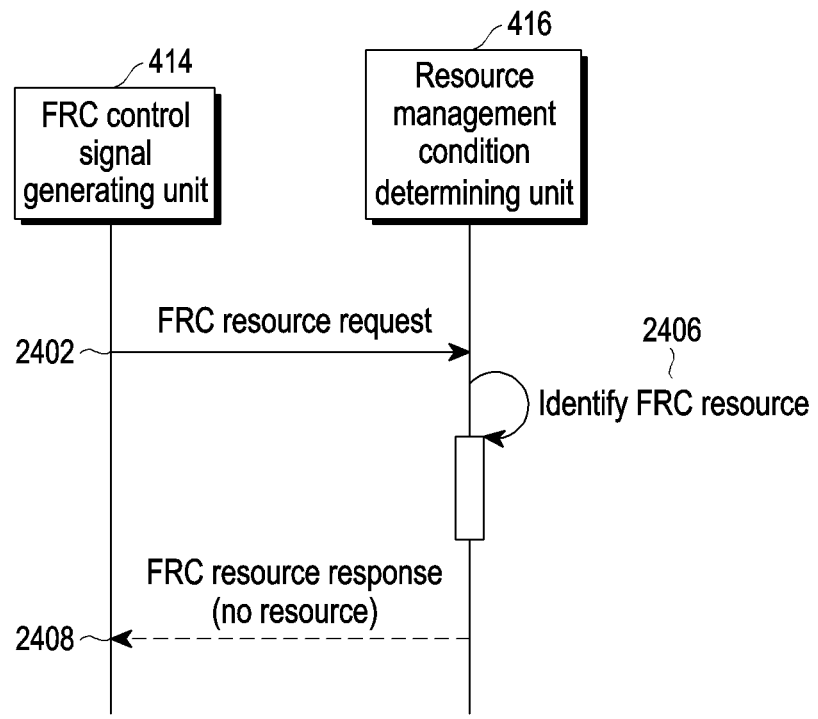
FIG. 24 is a signal flowchart illustrating a procedure of allocating an FRC resource without priority according to an embodiment.

FIG. 24 is a signal flowchart illustrating a procedure of allocating an FRC resource without priority according to an embodiment.

Referring to FIG. 24, in operation 2402, the FRC control signal generating unit 414 corresponding to the application requiring a new FRC resource may transmit a resource request signal for requesting allocation of an FRC resource to the resource management condition determining unit 416. In operation 2406, the resource management condition determining unit 416 may identify the absence (or insufficient) of an extra FRC resource as a result of determining whether there is an extra FRC resource allocable to the application.

In operation 2408, the resource management condition determining unit 416 may transmit an FRC resource response signal (e.g., 'no resource') indicating that it is impossible to allocate an FRC resource to the FRC control signal generating unit 414. In an embodiment, the FRC control signal generating unit 414 may transmit a signal indicating that FRC processing is impossible to the application 405 directly or via the FRC control condition determining unit 412.

Figure 25:
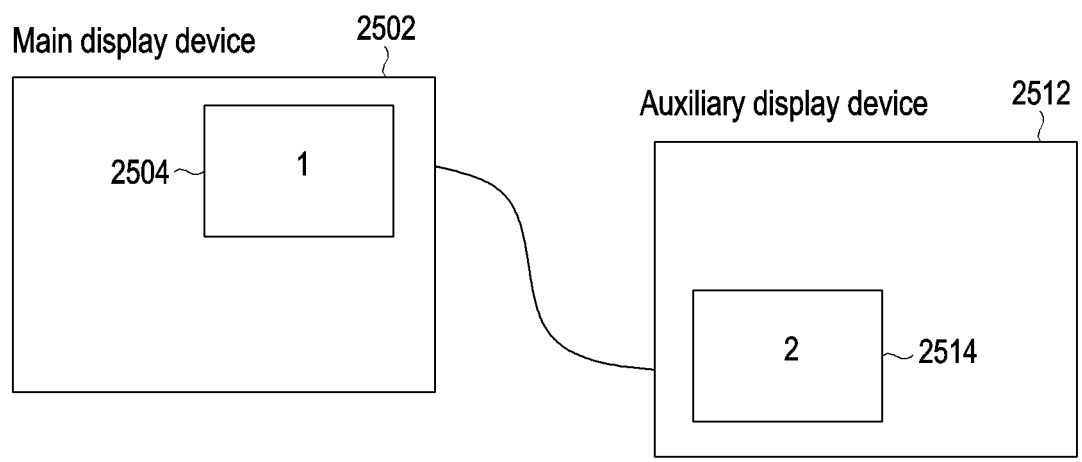
FIG. 25 is a schematic view illustrating screen mirroring according to an embodiment.

FIG. 25 is a schematic view illustrating screen mirroring according to an embodiment.

Referring to FIG. 25, the main display device 2502 may be, e.g., the electronic device 101. The main display device 2502 may play back video in the first screen area 2504. In an embodiment, the main display device 2502 may be connected with an auxiliary display device 2512 (e.g., an external electronic device 102 connected with the electronic device 101 through a short-range wireless communication network) and may simultaneously play back specific video data (e.g., video data 200) in the first screen area 2504 of the main display device 2502 and the second screen area 2514 of the auxiliary display device 2512 through screen mirroring.

In an embodiment, the main display device 2502 may play back the video data in the first screen area 2504 through FRC processing. In an embodiment, when the auxiliary display device 2512 includes no FRC processing unit (e.g., the FRC processing unit 420), the main display device 2502 may transmit video data for which FRC processing has been completed to the auxiliary display device 2512, and the auxiliary display device 2512 may play back the FRC-processed video in the second screen area 2514.

Figure 26:
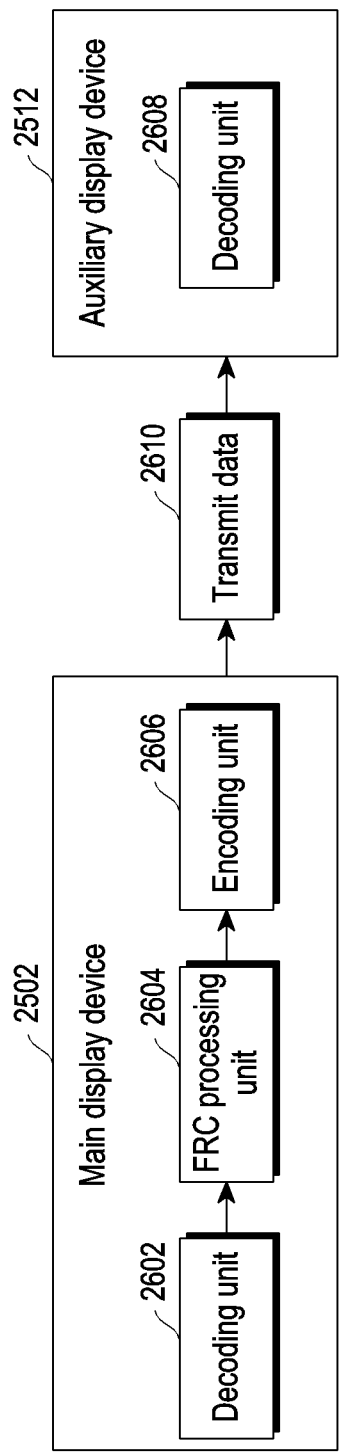
FIG. 26 is a schematic view illustrating an operation of transmitting FRC-processed video data by a main display device according to an embodiment.

FIG. 26 is schematic a view illustrating an operation of transmitting FRC-processed video data by a main display device according to an embodiment.

Referring to FIG. 26, the main display device 2502 may include a decoding unit 2602 (e.g., application 405), an FRC processing unit 2604 (e.g., FRC processing unit 420), and an encoding unit 2606. In an embodiment, the decoding unit 2602, the FRC processing unit 2604, and the encoding unit 2606 may be included in the processor 120 of the electronic device 101. The decoding unit 2602 may generate video frames by decoding the video data. The FRC processing unit 2604 may dynamically perform FRC processing according to playback section information about video data and generate output video frames including interpolation frames and input video frames. The encoding unit 2606 may encode video frames output from the FRC processing unit 2604 to generate video data 2610 for transmission.

In an embodiment, the video data for transmission 2610 may be transmitted to the auxiliary display device 2512 through an appropriate means (e.g., a wired or wireless communication scheme). The auxiliary display device 2512 may include a decoding unit 2608.

The decoding unit 2608 may decode the video data for transmission 2610 to generate video frames and play back the video frames in the screen area 2514.

Figure 27:
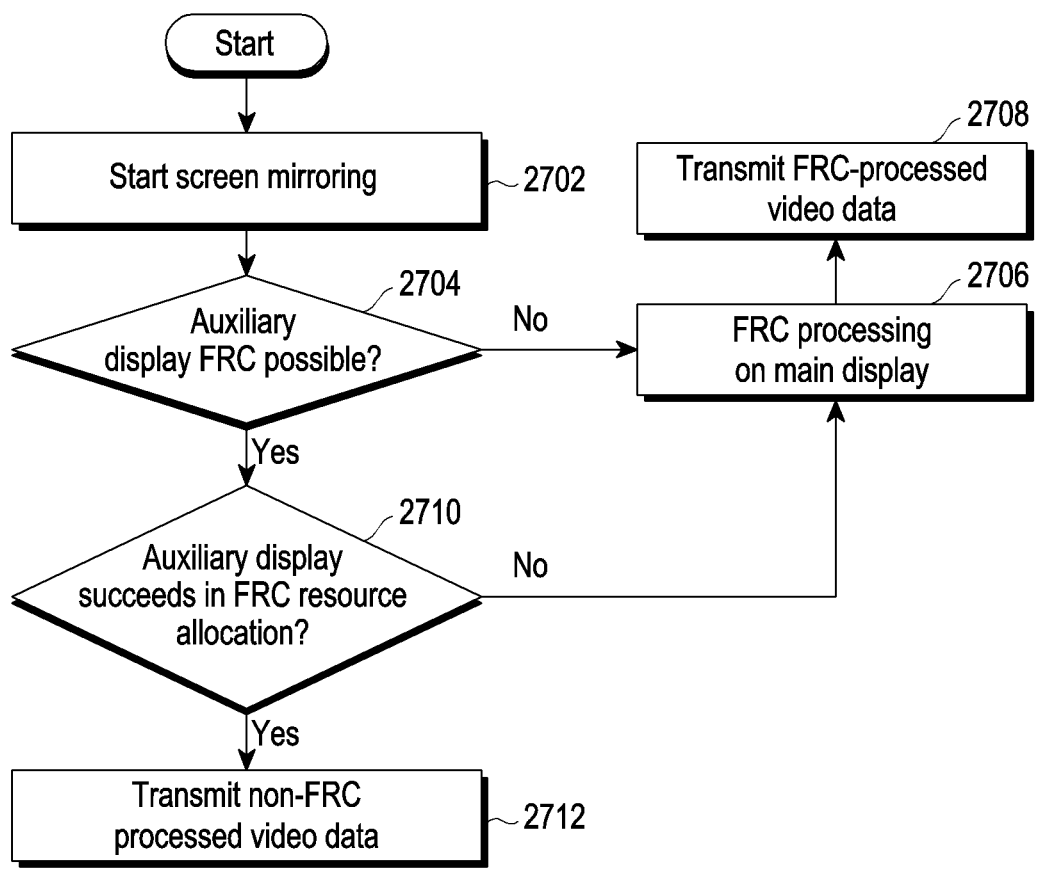
FIG. 27 is a flowchart illustrating FRC resource allocation considering FRC capability of an auxiliary display device according to an embodiment.

FIG. 27 is a flowchart illustrating FRC resource allocation considering FRC capability of an auxiliary display device according to an embodiment. At least one of the operations described below may be executed by the processor 120 of the electronic device 101.

Referring to FIG. 27, in operation 2702, the processor 120 may determine to start screen mirroring through the auxiliary display device (e.g., the auxiliary display device 2512). In an embodiment, the processor 120 may determine to start screen mirroring in response to detecting a user input to request screen mirroring and/or connection of the auxiliary display device 2512 for the electronic device 101.

In operation 2704, the processor 120 may determine whether FRC processing of the video data to be played back through screen mirroring on the auxiliary display device 2512 is possible. In an embodiment, the processor 120 may know whether the auxiliary display device 2512 is capable of FRC processing based on device information received from the auxiliary display device 2512 while the auxiliary display device 2512 is connected. In an embodiment, the processor 120 may inquire the auxiliary display device 2512 whether FRC processing is possible and be aware whether the auxiliary display device 2512 is capable of FRC processing through the response. When the auxiliary display device 2512 is incapable of FRC processing, operation 2706 may be performed. In contrast, when the auxiliary display device 2512 is capable of FRC processing, operation 2710 may be performed.

In operation 2706, the processor 120 (e.g., the FRC processing unit 2604) may perform FRC processing and generate FRC-processed video data (e.g., video data for transmission 2610). In operation 2708, the processor 120 may transmit the FRC-processed video data to the auxiliary display device 2512.

In operation 2710, the processor 120 may determine whether the auxiliary display device 2512 is capable of FRC resource allocation for the video data. In an embodiment, the processor 120 may transmit a resource request signal for FRC resource allocation to the auxiliary display device 2512 and, by receiving a response signal indicating FRC resource allocation from the auxiliary display device 2512, identify that a frequency is allocated by the auxiliary display device 2512 and proceed to operation 2712. Upon receiving a response signal indicating that FRC resource allocation fails from the auxiliary display device 2512, the processor 120 may proceed to operation 2706.

In operation 2712, the processor 120 may transmit the video data to the auxiliary display device 2512 without FRC processing. The auxiliary display device 2512 may perform FRC processing on the video data and then display it through the screen area 2514.

Figure 28:
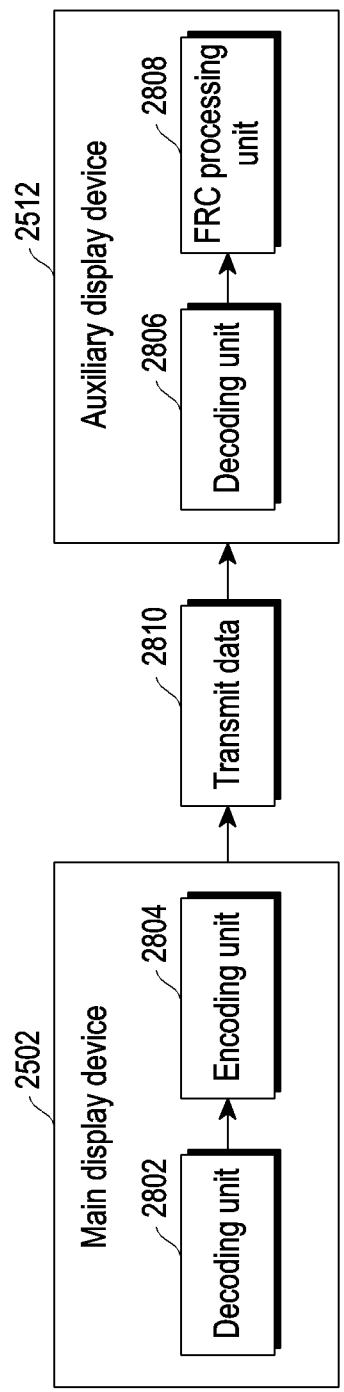
FIG. 28 is a schematic view illustrating an operation of performing FRC processing by an auxiliary display device according to an embodiment.

FIG. 28 is a view illustrating an operation of performing FRC processing by an auxiliary display device according to an embodiment.

Referring to FIG. 28, the main display device 2502 may include a decoding unit 2802 and an encoding unit 2804. In an embodiment, the decoding unit 2802 and the encoding unit 2804 may be included in the processor 120 of the electronic device 101. The decoding unit 2602 may generate video frames by decoding the video data. The encoding unit 2606 may encode the video frames to generate video data 2810 for transmission.

In an embodiment, the video data for transmission 2810 may be transmitted to the auxiliary display device 2512 through an appropriate means (e.g., a wired or wireless communication scheme). The auxiliary display device 2512 may include a decoding unit 2806 and an FRC processing unit 2808. The decoding unit 2808 may generate video frames by decoding the video data 2610 for transmission. The FRC processing unit 2808 may perform FRC processing on video frames and generate output video frames including interpolation frames and input video frames. According to an embodiment, the video data 2610 for transmission may include playback section information, and the FRC processing unit 2808 may dynamically generate interpolation frames per section, for the video frames. The output video frames may be displayed through the screen area 2514.

In an embodiment, when the performance of the main display device 2502 is much higher than the performance of the auxiliary display device 2512 or the performance of the auxiliary display device 2512 is determined to be insufficient as compared with the main display device 2502 in a circumstance where the data transmission rate and bandwidth between the main display device 2502 and the auxiliary display device 2512 are sufficient, the processor 120 may perform the operations of FIG. 27.

In an embodiment, when the auxiliary display device 2512 is capable of FRC processing (e.g., when including the FRC processing unit 420), the processor 120 may determine to allow the main display device 2502 to perform FRC processing according to the condition of Equation 1.

$$C<E<=A, B, \text{ or } D \qquad \text{[Equation 1]}$$

Here, A may be the processing rate (e.g., the rate of decoding, FRC processing, and encoding) of the main display device 2502.

B may be the data transmission rate between the main display device 2502 and the auxiliary display device 2512.

C may be a first processing rate (e.g., the rate of decoding and FRC processing) of the auxiliary display device 2512.

D may be a second processing rate (e.g., decoding rate) of the auxiliary display device 2512.

E may be the video playback rate.

Figure 29:
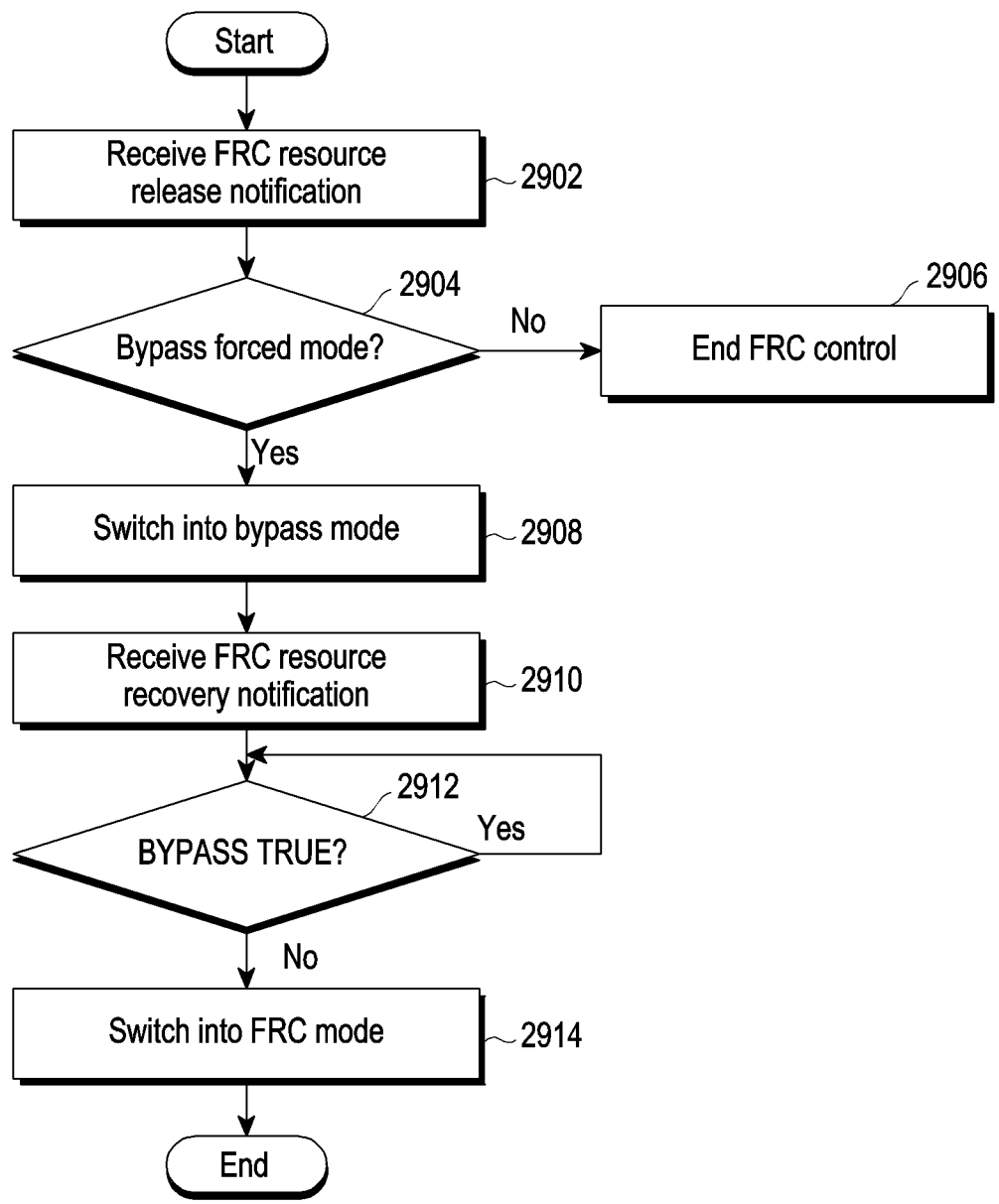
FIG. 29 is a flowchart illustrating an operation of releasing and recovering an FRC resource according to an embodiment.

FIG. 29 is a flowchart illustrating an operation of releasing and recovering an FRC resource according to an embodiment. At least one of the operations described below may be executed by the processor 120 (e.g., the FRC control condition determining unit 412) of the electronic device 101.

Referring to FIG. 29, in operation 2902, the processor 120 (e.g., the FRC control condition determining unit 412) may receive a notification signal indicating that the FRC resource allocated to a specific application (e.g., the application 405) is released, from the resource management condition determining unit 416. In an embodiment, the FRC resource allocated to the application 405 may be released to be reallocated to the application having higher priority. In an embodiment, the resource management condition determining unit 416 may determine to release the FRC resource based on the operations of FIG. 20 and transfer the notification signal to the FRC control condition determining unit 412 through the FRC control signal generating unit 414.

In operation 2904, the processor 120 (e.g., the FRC control condition determining unit 412) may determine whether the bypass forced mode is set. In an embodiment, as in operation 1902, the bypass forced mode may be set by receiving the bypass forced setting signal from the application 405. If the bypass forced mode is set, the processor 120 may proceed to operation 2908 and may otherwise proceed to operation 2906. In operation 2906, the processor 120 (e.g., the FRC control condition determining unit 412) may terminate the FRC control operation (e.g., terminate FRC processing). In an embodiment, the processor 120 (e.g., the FRC control condition determining unit 412) may notify the application 405 that FRC processing is terminated. The application 405 notified of the termination of FRC processing may not transfer video frames to the FRC controller 410.

In operation 2908, the processor 120 (e.g., the FRC control condition determining unit 412) may switch to the bypass mode for forcing bypass. In operation 2910, the processor 120 (e.g., the FRC control condition determining unit 412) may receive a notification signal indicating that the FRC resource for the application 405 is recovered, from the resource management condition determining unit 416. In an embodiment, when at least one application using the FRC resource is terminated, the FRC resource may be recovered to be reallocated to the application 405. The resource management condition determining unit 416 may detect the recovery of the FRC resource and transmit the notification signal to the FRC control condition determining unit 412. The processor 120 (e.g., the FRC control condition determining unit 412) may resume FRC processing by executing operations 2912 to 2914 in response to reception of the notification signal while the bypass forced mode is set.

In operation 2912, the processor 120 (e.g., the FRC control condition determining unit 412) may identify the bypass control value of the input video frame stored in the buffer queue. Based on the bypass control value being TRUE, operation 2912 may be repeated on the input video frames stored in the buffer queue. Otherwise (e.g., if FALSE), the processor 120 may proceed to operation 2914.

In operation 2914, the processor 120 (e.g., the FRC control condition determining unit 412) may switch to the FRC mode. In an embodiment, the processor 120 (e.g., the FRC control condition determining unit 412) may transmit a start signal to the FRC processing unit 420 through the FRC control signal generating unit 414 and transfer subsequent input video frames to the FRC processing unit 420. Thereafter, the processor 120 (e.g., the FRC control condition determining unit 412) may receive interpolation frames from the FRC processing unit 420 and transmit output video frames including the interpolation frames and the input video frames to the application 405.

Figure 30:
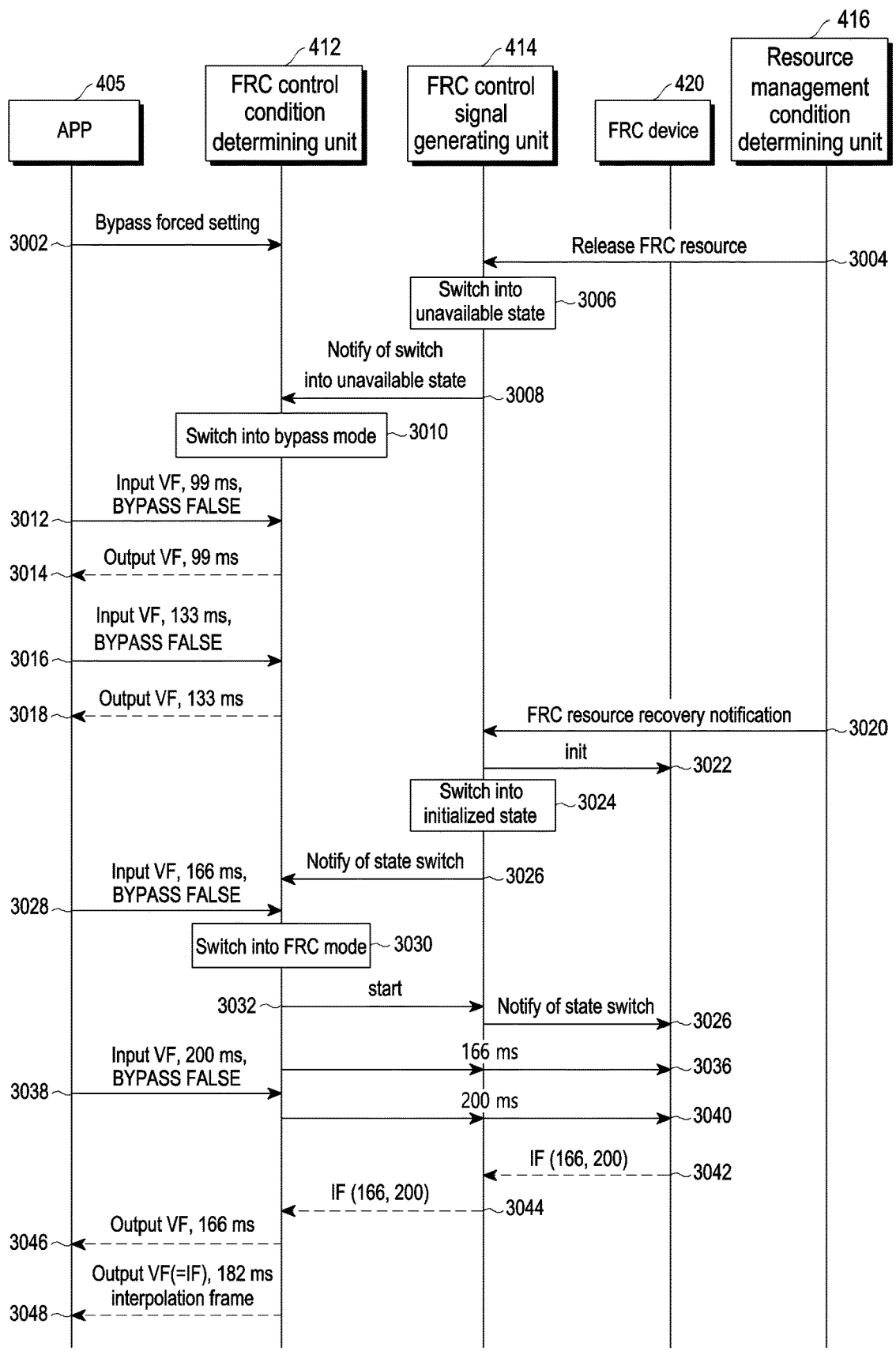
FIG. 30 is a signal flowchart illustrating releasing and recovery of an FRC resource according to an embodiment.

FIG. 30 is a signal flowchart illustrating releasing and recovery of an FRC resource according to an embodiment.

Referring to FIG. 30, in operation 3002, the application 405 may transmit a bypass forced setting signal to request to set the bypass forced mode to the FRC control condition determining unit 412. The FRC control condition determining unit 412 may recognize that bypass forcing of the video data related to the application is set in response to reception of the bypass forced setting signal. In an embodiment, the FRC control condition determining unit 412 may set the bypass forced mode in response to reception of the bypass forced setting signal and, when the bypass forced mode is set, determine whether to switch to the bypass mode according to the release or recovery of the FRC resource. In an embodiment, operation 1902 may be omitted. The FRC control condition determining unit 412 may determine whether to switch to the bypass mode according to the release or recovery of the FRC resource without a bypass forced setting signal from the application 405.

In an embodiment, the application 405 may be using the FRC processing unit 420 through the FRC controller 410. In operation 3004, the resource management condition determining unit 416 may transmit an FRC resource release notification signal indicating that the FRC resource allocated to the application 405 is released to the FRC control signal generating unit 414. In an embodiment, the resource management condition determining unit 416 may release the FRC resource being used by the application 405 in response to another application (e.g., application A 2202) being rendered to have a higher priority than the application 405 (e.g., application B 2204) or detecting the execution of another application (e.g., application C 2206) having a higher priority than the application 405 (e.g., application B 2204). In an embodiment, the resource management condition determining unit 416 may detect the release of the FRC resource of the application 405 according to the priority condition policy described in connection with FIG. 21.

In operation 3006, the FRC control signal generating unit 414 may switch the FRC processing unit 420 to the inactive state (e.g., the unavailable state 710) in response to the FRC resource release notification signal. In operation 3008, the FRC control signal generating unit 414 may transmit a state switch notification signal indicating that the FRC processing unit 420 is switched to the inactive state to the FRC control condition determining unit 412. In operation 3010, the FRC control condition determining unit 412 may recognize the switch of the FRC processing unit 420 to the inactive state by the state switch notification signal in a state in which the bypass forced mode is set and accordingly switch to the bypass mode.

In operation 3012, the FRC control condition determining unit 412 may receive the input video frame of timestamp 99 ms ('input VF, 99 ms') and the bypass control value ('BYPASS FALSE') set to FALSE from the application 405. The FRC control condition determining unit 412 may recognize that the bypass mode is for forcing bypass and maintain the bypass mode despite BYPASS FALSE. In operation 3014, the FRC control condition determining unit 412 does not transfer 'input VF, 99 ms' to the FRC processing unit 420 but may transmit 'output VF, 99 ms' including 'input VF, 99 ms' to the application 405.

Likewise, in operation 3016, the FRC control condition determining unit 412 may receive 'input VF, 133 ms' and BYPASS FALSE from the application 405 and, in operation 3018, transmit 'output VF, 1339 ms' including 'input VF, 133 ms' to the application 405.

In operation 3020, the resource management condition determining unit 416 may transmit an FRC resource recovery notification signal indicating that the FRC resource allocable to the application 405 is recovered to the FRC control signal generating unit 414. In an embodiment, the resource management condition determining unit may determine that the FRC resource is recovered to be reallocated to the application 405 in response to another application being rendered to have a lower priority than the application 405 or detecting the termination of another application using the FRC resource. In an embodiment, the resource management condition determining unit 416 may detect recovery of the FRC resource of the application 405 according to the priority condition policy described in connection with FIG. 21. The resource management condition determining unit 416 may detect the recovery of the FRC resource and transmit the FRC resource recovery notification signal to the FRC control condition determining unit 412.

In operation 3022, the FRC control signal generating unit 414 may recognize recovery of the FRC resource by the FRC resource recovery notification signal and transmit an initialize signal to the FRC processing unit 420. In operation 3024 after transmitting the initialize signal, the FRC control signal generating unit 414 may switch the FRC processing unit 420 to the initialized state (e.g., the initialized state 704). In an embodiment, the FRC control signal generating unit 414 may transfer the FRC resource recovery notification signal to the FRC control condition determining unit 412.

In operation 3026, the FRC control signal generating unit 414 may transmit a state switch notification signal indicating that the FRC processing unit 420 is switched to the initialized state to the FRC control condition determining unit 412. In an embodiment, the FRC control condition determining unit 412 may determine that the bypass mode for forcing bypass is released in response to the state switch notification signal. In operation 3028, the FRC control condition determining unit 412 may receive 'input VF, 166 ms' and BYPASS FALSE from the application 405. As it recognizes that the FRC processing unit 420 is switched to the initialized state, in operation 3030, the FRC control condition determining unit 412 may switch to the FRC mode in response to BYPASS FALSE and, in operation 3032, transmit a start signal to the FRC control signal generating unit 414. In operation 3034, the start signal may be transferred to the FRC processing unit 420 by the FRC control signal generating unit 414.

In operation 3036, the FRC control condition determining unit 412 may transfer 'input VF, 166 ms' to the FRC processing unit 420. In operation 3038, the FRC control condition determining unit 412 may receive 'input VF, 200 ms' and BYPASS FALSE from the application 405 and, in operation 3040, transfer 'input VF, 200 ms' to the FRC processing unit 420.

In operations 3042 and 3044, the FRC processing unit 420 may transfer the interpolation frame ('IF (166, 200)') generated using 'input VF, 166 ms' and 'input VF, 200 ms' to the FRC control condition determining unit 412 through, e.g., the FRC control signal generating unit 414. In operation 3046, the FRC control condition determining unit 412 may transmit the output video frame ('output VF, 166 ms') including 'input VF, 166 ms' to the application 405. In operation 3048, the FRC control condition determining unit 412 may transmit the output video frame ('output VF, 182 ms') including the 'IF, (166,200)' to the application 405.

According to the embodiments of the disclosure, the electronic device and operation method thereof may generate interpolation frames dynamically using FRC, reducing the power consumption of the electronic device.

According to the embodiments of the disclosure, the electronic device and operation method thereof may dynamically generate interpolation frames while maintaining the response time of video to universally apply FRC to the electronic device, e.g., a mobile device.

According to the embodiments of the disclosure, the electronic device and operation method thereof may dynamically generate interpolation frames while allowing for seamless playback of video when switching between the FRC mode and the bypass mode.

According to the embodiments of the disclosure, the electronic device and operation method thereof may efficiently process FRC in various scenarios using limited system resources and enable seamless video playback even in the circumstance where the FRC resource is released/recovered by using the bypass mode.

According to an embodiment, an electronic device 101 may comprise a display module 160 and at least one processor 120 operatively connected with the display module. The at least one processor may be configured to obtain a first video frame and a bypass control value related to the first video frame from video data. The at least one processor may be configured to determine whether to perform frame rate conversion (FRC) processing using the first video frame based on the bypass control value. The at least one processor may be configured to, in response to the bypass control value being set to a first value indicating bypass of the FRC processing, display the first video frame on the display module. The at least one processor may be configured to, in response to the bypass control value being set to a second value indicating the FRC processing. The at least one processor may be configured to generate an interpolation frame using the first video frame and a second video frame after the first video frame. The at least one processor may be configured to display the first video frame, the interpolation frame, and the second video frame on the display module.

According to an embodiment, the at least one processor may be configured to generate the bypass control value based on a playback rate set by an application playing back the video data or a user or a playback rate set per time section of the video data.

In an embodiment, the at least one processor may be configured to recognize that forcing the bypass of the FRC processing is set by an application playing back the video data, set a bypass mode for forcing the bypass in response to identifying that an FRC processing unit performing the FRC processing is not ready, obtain a third video frame and a first bypass control value related to the third video frame from the video data, identify that the first bypass control value is set to the second value indicating the FRC processing, and determine not to transfer the third video frame to the FRC processing unit according to the bypass mode for forcing the bypass.

In an embodiment, the at least one processor may be configured to recognize that forcing the bypass of the FRC processing is set by an application playing back the video data, set a bypass mode for forcing the bypass in response to identifying that a size of a screen area displaying the video data on the display module is smaller than a designated threshold, obtain a third video frame and a first bypass control value related to the third video frame from the video data, identifies that the first bypass control value is set to the second value indicating the FRC processing, and determine not to transfer the third video frame to the FRC processing unit performing the FRC processing according to the bypass mode for forcing the bypass.

In an embodiment, the at least one processor may be configured to recognize that forcing the bypass of the FRC processing is set by an application playing back the video data, set a bypass mode for forcing the bypass in response to identifying that a display output frequency for outputting the video data on the display module is smaller than a designated threshold, obtain a third video frame and a first bypass control value related to the third video frame from the video data, identify that the first bypass control value is set to the second value indicating the FRC processing, and determine not to transfer the third video frame to the FRC processing unit performing the FRC processing according to the bypass mode for forcing the bypass.

In an embodiment, the at least one processor may be configured to recognize that forcing the bypass of the FRC processing is set by an application playing back the video data, set a bypass mode for forcing the bypass in response to identifying that an image variance of video frames including a third video frame of the video data is smaller than a given threshold, obtain the third video frame and a first bypass control value related to the third video frame from the video data, identify that the first bypass control value is set to the second value indicating the FRC processing, and determine not to transfer the third video frame to the FRC processing unit performing the FRC processing according to the bypass mode for forcing the bypass.

In an embodiment, the at least one processor may be configured to recognize that forcing the bypass of the FRC processing is set by an application playing back the video data, set a bypass mode for forcing the bypass in response to identifying that a field of view of extended reality (XR) glasses connected with the electronic device falls outside a field of view of a camera module, obtain a third video frame and a first bypass control value related to the third video frame from the video data, identify that the first bypass control value is set to the second value indicating the FRC processing, and determine not to transfer the third video frame to the FRC processing unit performing the FRC processing according to the bypass mode for forcing the bypass.

In an embodiment, the at least one processor may be configured to set a bypass mode for forcing the bypass in response to release of an FRC resource for the FRC processing, obtain a third video frame and a first bypass control value related to the third video frame from the video data, identify that the first bypass control value is set to the second value indicating the FRC processing, and determine not to transfer the third video frame to the FRC processing unit performing the FRC processing according to the bypass mode for forcing the bypass.

In an embodiment, the at least one processor may be configured to release the bypass mode for forcing the bypass in response to identifying that the FRC resource is recovered, obtain a fourth video frame and a second bypass control value related to the fourth video frame from the video data, and transfer the fourth video frame to the FRC processing unit based on identifying that the second bypass control value is set to the second value indicating the FRC processing.

In an embodiment, the at least one processor may include an application configured to decode the video data to generate the first video frame and the bypass control value, an FRC controller configured to determine whether to perform the FRC processing on the first video frame based on the bypass control value, and an FRC processing unit configured to generate the interpolation frame using the first video frame and the second video frame according to the determination by the FRC controller.

According to an embodiment, a method for operating an electronic device 101 may comprise obtaining a first video frame and a bypass control value related to the first video frame from video data, as shown at operation 902. The method may comprise determining whether to perform frame rate conversion (FRC) processing using the first video frame based on the bypass control value, as shown at operation 904. The method may comprise, in response to the bypass control value being set to a first value indicating bypass of the FRC processing, displaying the first video frame, as shown at operations 908 and 918. The method may comprise, in response to the bypass control value is set to a second value indicating the FRC processing, generating an interpolation frame using the first video frame and a second video frame after the first video frame, as shown at operation 914. The method may comprise displaying the first video frame, the interpolation frame, and the second video frame, as shown at operations 916 and 918.

In an embodiment, the method may further comprise generating the bypass control value based on a playback rate set by an application playing back the video data or a user or a playback rate set per time section of the video data.

In an embodiment, the method may further comprise recognizing that forcing bypass of the FRC processing is set by an application playing back the video data, setting a bypass mode for forcing the bypass in response to identifying that an FRC processing unit performing the FRC processing is not ready, obtaining a third video frame and a first bypass control value related to the third video frame from the video data, identifying that the first bypass control value is set to the second value indicating the FRC processing, and determining not to transfer the third video frame to the FRC processing unit according to the bypass mode for forcing the bypass.

In an embodiment, the method may further comprise recognizing that forcing bypass of the FRC processing is set by an application playing back the video data, setting a bypass mode for forcing the bypass in response to identifying that a size of a screen area displaying the video data on the display module is smaller than a designated threshold, obtaining a third video frame and a first bypass control value related to the third video frame from the video data, identifying that the first bypass control value is set to the second value indicating the FRC processing, and determining not to transfer the third video frame to the FRC processing unit performing the FRC processing according to the bypass mode for forcing the bypass.

In an embodiment, the method may further comprise recognizing that forcing bypass of the FRC processing is set by an application playing back the video data, setting a bypass mode for forcing the bypass in response to identifying that a display output frequency for outputting the video data on the display module is smaller than a designated threshold, obtaining a third video frame and a first bypass control value related to the third video frame from the video data, identifying that the first bypass control value is set to the second value indicating the FRC processing, and determining not to transfer the third video frame to the FRC processing unit performing the FRC processing according to the bypass mode for forcing the bypass.

In an embodiment, the method may further comprise recognizing that forcing bypass of the FRC processing is set by an application playing back the video data, setting a bypass mode for forcing the bypass in response to identifying that an image variance of video frames including a third video frame of the video data is smaller than a given threshold, obtaining the third video frame and a first bypass control value related to the third video frame from the video data, identifying that the first bypass control value is set to the second value indicating the FRC processing, and determining not to transfer the third video frame to the FRC processing unit performing the FRC processing according to the bypass mode for forcing the bypass.

In an embodiment, the method may further comprise recognizing that forcing bypass of the FRC processing is set by an application playing back the video data, setting a bypass mode for forcing the bypass in response to identifying that a field of view of extended reality (XR) glasses connected with the electronic device falls outside a field of view of a camera module, obtaining a third video frame and a first bypass control value related to the third video frame from the video data, identifying that the first bypass control value is set to the second value indicating the FRC processing, and determining not to transfer the third video frame to the FRC processing unit performing the FRC processing according to the bypass mode for forcing the bypass.

In an embodiment, the method may further comprise setting a bypass mode for forcing the bypass in response to release of an FRC resource for the FRC processing, obtaining a third video frame and a first bypass control value related to the third video frame from the video data, identifying that the first bypass control value is set to the second value indicating the FRC processing, and determining not to transfer the third video frame to the FRC processing unit performing the FRC processing according to the bypass mode for forcing the bypass.

In an embodiment, the method may further comprise releasing the bypass mode for forcing the bypass in response to identifying that the FRC resource is recovered, obtaining a fourth video frame and a second bypass control value related to the fourth video frame from the video data, and transferring the fourth video frame to the FRC processing unit based on identifying that the second bypass control value is set to the second value indicating the FRC processing.

In an embodiment, the method may further comprise decoding the video data to generate the first video frame and generating the bypass control value based on playback section information about the video data.

In an embodiment, the method may further comprises setting a bypass mode for forcing the bypass in response to identifying that the electronic device is a battery powered device and that the electronic device is operating in a low power mode, obtaining a third video frame and a first bypass control value related to the third video frame from the video data, identifying that the first bypass control value is set to the second value indicating the FRC processing, and determining not to transfer the third video frame to the FRC processing unit performing the FRC processing according to the bypass mode for forcing the bypass.

In an embodiment, the method may further comprises receiving a request to mirror a display of the electronic device on an auxiliary display device, determining whether the auxiliary display device is capable of FRC processing, based on a determination that the auxiliary display device is capable of FRC processing, transmitting the video data to the auxiliary display device, and based on a determination that the auxiliary display device is not capable of FRC processing, transmitting FRC-processed video data to the auxiliary display device, wherein the FRC-processed video data includes, the first video frame, the interpolation frame, and the second video frame.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., a master device or a device performing tasks). For example, a processor of the machine (e.g., a master device or a device performing tasks) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a display;
at least one hardware processor, and
memory storing one or more computer programs, wherein the one or more computer programs include computer-executable instructions that, when executed by the at least one hardware processor, cause the electronic device to:
obtain a first video frame and a bypass control value related to the first video frame from a video data,
determine whether to perform frame rate conversion (FRC) processing using the first video frame based at least in part on the bypass control value,
in response to the bypass control value being set to a first value indicating bypass of the FRC processing, display the first video frame on the display module,
in response to the bypass control value being set to a second value indicating to perform the FRC processing:
determine whether a bypass mode for forcing the bypass is set,
in response to the bypass mode not being set, generate an interpolation frame using the first video frame and a second video frame after the first video frame, and
display the first video frame, the interpolation frame, and the second video frame on the display module.

2. The electronic device of claim 1, wherein the computer-executable instructions that, when executed by the at least one hardware processor, cause the electronic device to generate the bypass control value based on one or more of a playback rate set by one of an application playing the video data and a user and a playback rate set per time section of the video data.

3. The electronic device of claim 1, wherein the computer-executable instructions that, when executed by the at least one hardware processor, cause the electronic device to,
set the bypass mode for forcing the bypass in response to identifying that an FRC processing unit configured to perform the FRC processing is not ready,
obtain a third video frame and a first bypass control value related to the third video frame from the video data,
identify that the first bypass control value is set to the second value indicating the FRC processing, and
determine not to transfer the third video frame to the FRC processing unit according to the bypass mode for forcing the bypass.

4. The electronic device of claim 1, wherein the computer-executable instructions that, when executed by the at least one hardware processor, cause the electronic device to,
set the bypass mode for forcing the bypass in response to identifying that a size of a screen area displaying the video data on the display module is smaller than a designated threshold,
obtain a third video frame and a first bypass control value related to the third video frame from the video data,
identify that the first bypass control value is set to the second value indicating the FRC processing, and
determine not to transfer the third video frame to the FRC processing unit performing the FRC processing according to the bypass mode for forcing the bypass.

5. The electronic device of claim 1, wherein the computer-executable instructions that, when executed by the at least one hardware processor, cause the electronic device to,
set the bypass mode for forcing the bypass in response to identifying that a display output frequency for outputting the video data on the display module is smaller than a designated threshold,
obtain a third video frame and a first bypass control value related to the third video frame from the video data,
identify that the first bypass control value is set to the second value indicating the FRC processing, and
determine not to transfer the third video frame to the FRC processing unit performing the FRC processing according to the bypass mode for forcing the bypass.

6. The electronic device of claim 1, wherein the computer-executable instructions that, when executed by the at least one hardware processor, cause the electronic device to,
set the bypass mode for forcing the bypass in response to identifying that an image variance of video frames including the second video frame and a third video frame of the video data is smaller than a given threshold,
obtain the third video frame and a first bypass control value related to the third video frame from the video data,
identify that the first bypass control value is set to the second value indicating the FRC processing, and
determine not to transfer the third video frame to the FRC processing unit performing the FRC processing according to the bypass mode for forcing the bypass.

7. The electronic device of claim 1, wherein the computer-executable instructions that, when executed by the at least one hardware processor, cause the electronic device to,
set the bypass mode for forcing the bypass in response to identifying that a field of view of extended reality glasses connected with the electronic device falls outside a field of view of a camera module,
obtain a third video frame and a first bypass control value related to the third video frame from the video data,
identify that the first bypass control value is set to the second value indicating the FRC processing, and
determine not to transfer the third video frame to the FRC processing unit performing the FRC processing according to the bypass mode for forcing the bypass.

8. The electronic device of claim 1, wherein the computer-executable instructions that, when executed by the at least one hardware processor, cause the electronic device to,
set the bypass mode for forcing the bypass in response to release of an FRC resource for the FRC processing,
obtain a third video frame and a first bypass control value related to the third video frame from the video data,
identify that the first bypass control value is set to the second value indicating the FRC processing, and
determine not to transfer the third video frame to the FRC processing unit performing the FRC processing according to the bypass mode for forcing the bypass.

9. The electronic device of claim 8, wherein the computer-executable instructions that, when executed by the at least one hardware processor, cause the electronic device to,
release the bypass mode for forcing the bypass in response to identifying that the FRC resource is recovered, obtain a fourth video frame and a second bypass control value related to the fourth video frame from the video data, and transfer the fourth video frame to the FRC processing unit based on identifying that the second bypass control value is set to the second value indicating the FRC processing.

10. The electronic device of claim 1, wherein the at least one hardware processor includes, an application configured to decode the video data to generate the first video frame and the bypass control value, an FRC controller configured to determine whether to perform the FRC processing on the first video frame based on the bypass control value, and an FRC processing unit is configured to generate the interpolation frame using the first video frame and the second video frame according to the determination by the FRC controller.

11. A method, comprising:

obtaining a first video frame and a bypass control value related to the first video frame from a video data determining whether to perform frame rate conversion (FRC) processing using the first video frame based at least in part on the bypass control value, based on a determination that the bypass control value is set to a first value indicating bypass of the FRC processing, displaying the first video frame, based on a determination that the bypass control value is set to a second value indicating performing of the FRC processing:

determine whether a bypass mode for forcing the bypass is set, in response to the bypass mode not being set, generating an interpolation frame using the first video frame and a second video frame after the first video frame, and displaying the first video frame, the interpolation frame, and the second video frame.

12. The method of claim 11, further comprising generating the bypass control value based on one or more of a playback rate set by one of an application playing back the video data and a user and a playback rate set per time section of the video data.

13. The method of claim 11, further comprising:

setting the bypass mode for forcing the bypass in response to identifying that an FRC processing unit configured to perform the FRC processing is not ready, obtaining a third video frame and a first bypass control value related to the third video frame from the video data, identifying that the first bypass control value is set to the second value indicating the FRC processing, and determining not to transfer the third video frame to the FRC processing unit according to the bypass mode for forcing the bypass.

14. The method of claim 11, further comprising:

setting the bypass mode for forcing the bypass in response to identifying that a size of a screen area displaying the video data on the display module is smaller than a designated threshold, obtaining a third video frame and a first bypass control value related to the third video frame from the video data, identifying that the first bypass control value is set to the second value indicating the FRC processing, and determining not to transfer the third video frame to the FRC processing unit performing the FRC processing according to the bypass mode for forcing the bypass.

15. The method of claim 11, further comprising:

setting the bypass mode for forcing the bypass in response to identifying that a display output frequency for outputting the video data on the display module is smaller than a designated threshold, obtaining a third video frame and a first bypass control value related to the third video frame from the video data, identifying that the first bypass control value is set to the second value indicating the FRC processing, and determining not to transfer the third video frame to the FRC processing unit performing the FRC processing according to the bypass mode for forcing the bypass.

16. The method of claim 11, further comprising:

setting the bypass mode for forcing the bypass in response to identifying that an image variance of video frames including the second video frame and a third video frame of the video data is smaller than a given threshold, obtaining the third video frame and a first bypass control value related to the third video frame from the video data, identifying that the first bypass control value is set to the second value indicating the FRC processing, and determining not to transfer the third video frame to the FRC processing unit performing the FRC processing according to the bypass mode for forcing the bypass.

17. The method of claim 11, further comprising:

setting the bypass mode for forcing the bypass in response to identifying that a field of view of extended reality glasses connected with the electronic device falls outside a field of view of a camera module, obtaining a third video frame and a first bypass control value related to the third video frame from the video data, identifying that the first bypass control value is set to the second value indicating the FRC processing, and determining not to transfer the third video frame to the FRC processing unit performing the FRC processing according to the bypass mode for forcing the bypass.

18. The method of claim 11, further comprising:

setting the bypass mode for forcing the bypass in response to release of an FRC resource for the FRC processing, obtaining a third video frame and a first bypass control value related to the third video frame from the video data, identifying that the first bypass control value is set to the second value indicating the FRC processing, and determining not to transfer the third video frame to the FRC processing unit performing the FRC processing according to the bypass mode for forcing the bypass.

19. The method of claim 18, further comprising:

releasing the bypass mode for forcing the bypass in response to identifying that the FRC resource is recovered, obtaining a fourth video frame and a second bypass control value related to the fourth video frame from the video data, and transferring the fourth video frame to the FRC processing unit based on identifying that the second bypass control value is set to the second value indicating the FRC processing.

20. The method of claim 11, further comprising:
decoding the video data to generate the first video frame, and
generating the bypass control value based on playback section information about the video data.

\* \* \* \* \*